(12) United States Patent (10) Patent No.: US 7,391,123 B2
Rome (45) Date of Patent: Jun. 24, 2008

(54) BACKPACK FOR HARVESTING ELECTRICAL ENERGY DURING WALKING AND FOR MINIMIZING SHOULDER STRAIN

(75) Inventor: Lawrence Rome, Strafford, PA (US)

(73) Assignee: Lightning Packs LLC, Strafford, PA (US)

( * ) Notice: Subject to any disclaimer, the term of this patent is extended or adjusted under 35 U.S.C. 154(b) by 14 days.

(21) Appl. No.: 11/056,849

(22) Filed: Feb. 11, 2005

(65) Prior Publication Data

US 2006/0192386 A1 Aug. 31, 2006

Related U.S. Application Data

(62) Division of application No. 10/803,112, filed on Mar. 17, 2004, now Pat. No. 6,982,497.

(60) Provisional application No. 60/455,477, filed on Mar. 17, 2003.

(51) Int. Cl.
*F03B 63/04* (2006.01)
(52) U.S. Cl. .................. 290/1 R; 290/1 A; 224/604; 224/605; 224/631; 224/634; 224/641
(58) Field of Classification Search ................ 290/1 R, 290/1 A, 1 B; 224/604, 605, 630, 637, 634, 224/641
See application file for complete search history.

(56) References Cited

U.S. PATENT DOCUMENTS

| 5,136,173 | A | 8/1992 | Rynne | 290/53 |
| 5,564,612 | A | 10/1996 | Gregory | 224/633 |

(Continued)

FOREIGN PATENT DOCUMENTS

CA 2 385 481 11/2002

OTHER PUBLICATIONS

"Energy Scavenging with Shoe-Mounted Piezoelectrics Piezoelectric Shoe Power; Two Approaches", *IEEE Micro, Computer.org*, http://www.computer.org/micro/homepage/may_june/shenck/01.htm, Feb. 28, 2003.
"Pedaling onto the Information Superhighway" http://cnn.technologyprintthis.clickability.com, Feb. 18, 2003, 2 pages.

(Continued)

*Primary Examiner*—Iraj A Mohandesi
(74) *Attorney, Agent, or Firm*—Woodcock Washburn LLP

(57) ABSTRACT

A suspended-load backpack designed to permit the load to move relative to the backpack frame during walking and running so that the large movements between the load and the frame of the backpack reduce the fluctuations of absolute vertical motion of the load. Because the hip (and thus the pack frame) go up a down a good deal during walking, a large relative movement between the frame and the load reduces the absolute excursion of the load. This movement may be, in turn, transferred to a motor through, for example, a rack and pinion gear, to convert the mechanical movement to electrical energy. The movement may also be converted to electrical energy by using an electroactive polymer (EAP) to connect the suspended load to the frame. Such designs allow the load to move in a controlled fashion to prevent the patient from losing his or her balance as the load moves up and down along the backpack frame. Such movement of the suspended-load relative to the frame also reduces the forces on the wearer's shoulders while walking or running, thus reducing the likelihood of orthopedic injury.

29 Claims, 21 Drawing Sheets

U.S. PATENT DOCUMENTS

| | | | | |
|---|---|---|---|---|
| 5,617,984 | A | 4/1997 | Fabel | 224/641 |
| 5,696,413 | A | 12/1997 | Woodbridge et al. | 310/15 |
| 5,762,243 | A | 6/1998 | McMaster et al. | 224/262 |
| 5,769,431 | A | 6/1998 | Cordova | 280/1.5 |
| 5,806,740 | A * | 9/1998 | Carlson | 224/628 |
| 5,818,132 | A | 10/1998 | Konotchick | 310/17 |
| 5,890,640 | A * | 4/1999 | Thompson | 224/630 |
| 5,902,073 | A * | 5/1999 | Eungard et al. | 405/187 |
| 5,904,282 | A | 5/1999 | Gleason | 224/635 |
| 5,984,157 | A * | 11/1999 | Swetish | 224/631 |
| 6,020,653 | A | 2/2000 | Woodbridge et al. | 290/53 |
| 6,179,186 | B1 * | 1/2001 | Blanking | 224/629 |
| 6,360,534 | B1 | 3/2002 | Denniss | 60/398 |
| 6,423,412 | B1 * | 7/2002 | Zhang et al. | 428/421 |
| 6,545,384 | B1 | 4/2003 | Pelrine et al. | 310/309 |
| 6,607,107 | B2 * | 8/2003 | Dexheimer | 224/604 |
| 6,619,523 | B1 | 9/2003 | Duckworth | 224/634 |
| 6,622,483 | B2 | 9/2003 | Denniss | 60/398 |
| 6,626,342 | B1 * | 9/2003 | Gleason | 224/633 |
| 6,802,442 | B1 * | 10/2004 | Thompson | 224/627 |
| 6,876,135 | B2 * | 4/2005 | Pelrine et al. | 310/339 |
| 2001/0035723 | A1 | 11/2001 | Pelrine et al. | 318/116 |
| 2003/0062723 | A1 | 4/2003 | Mancl et al. | 290/1 |

OTHER PUBLICATIONS

Engsberg, J. et al., "Comparison of Effort Between Below-Knee Amputee and Normal Children", *Journal of the Association of Children's Prosthetic-Orthotic Clinics*, 1991, 26(2), 46-53.

Fedak, M.A. et al., "One-step N2-Dilution technique for calibrating Open-Circuit VO2 Measuring Systems", *Journal of Applied Physiology*, 1981, R51, 772-776.

Hirano, M. et al., "Jumping Performance of Frogs(*Rana Pipiens*) as a Function of Muscle Temperature", *Journal of Experimental Biology*, 1984, 108,429-439.

Hong, Y. et al., "Gait and Posture Responses to Backpack Load during Level Walking in Children", *Gait and Posture*, 2003, 17(1), 28-33.

Kram, R., "Carrying Loads with Springy Poles", *Journal of Applied Physiology*, 1991, 71(3), 1119-1122.

LaFriandra, M.E. et al., "The Effect of Walking Grade and Backpack Mass on the Forces Exerted on the Hips and Shoulders by the Backpack", *United States Army Research institute of Environmental Medicine. United States Science Conference*, 2002, 2 pages.

Lutz, G.J. et al., "Built for Jumping: The Design of the Frog Muscular System", *Science*, 1994, 263, 370-372.

Negrini, S. et al., "Backpack as a Daily Load for Schoolchildren", *The Lancet*, 1999, 354(9194), 1974.

Taimela, S. et al., "The Prevalence of Low Back Pain Among Children and Adolescents. A Nationwide, Cohort-based Questionnaire Survey in Finland", *Spine*, 1997, 22(10), 1132-1136.

Troussier, B. et al., "Back Pain in School Children a Study Among 1178 Pupils", *Scandinavian Journal of Rehabilitation Medicine*, 1994, 26, 143-146.

Vacheron, JJ. et al., "The Effect of Loads Carried on the Shoulders", *Military Medicine*, 1999, 164(8), 597-599.

De Gaspari, J. et al., "Hot Stuff, Advanced Materials are moving out of the Lab and Into the Commercial World", *Mechanical Engineering*, 2002, 32-35.

James Drake, "The Greatest Shoe on Earth", Feb. 2001, *Wired*, 90-100.

Negrini, et al., "Backpacks On! Schoolchildren's Perception of Load, Associations with Back Pain and Factors Determining the Load", *Spine*, 2002, 27(2), 187-195.

Park, et al., "Ultrahigh Strain and Piezoelectric Behavior in Relaxof Based Ferroelectric Single Crystals", *J. Appl. Phys.*, 1997, 82, 1804.

Pelrine, et al., "Dielectric Elastomers: generator Mode Fundamentals and Applications", *Proceedings of SPIE-The International Society for Optical Engineering*, 2001, 4329, 148-156.

Shenck, N.S. et al., "Energy Scavenging with Shoe-Mounted Piezoelectrics", *IEEE*, 2001, 30-42.

Stanford, S. et al., "Electroactive Polymer Artificial Muscle for Underwater Robotics", *SRI International*, 10 pages.

Xia, et al., "High Electromechanical Responses in Terpolymer of Poly(vinylidene fluoride trifluoroethylene-chlorofluroethylene", *Adv Masters*, 2002, 14, 1574-1577.

Kymissis, J. et al., "Parasitic Power Harvesting in Shoes", *IEEE Int'l Conference Wearable Computing*, 1998, 132-139.

Davies, C.T.M. et al., "Maximal Mechanical Power Output of Cyclists and Young Adults", *European Journal of Applied Physiology*, 1989, 58, 838-844.

Martin, J.C., "Inertial-load Method Determines Maximal Cycling Power in a Single Exercise Bout", *Medicine and Science in Sports and Exercise*, 1997, 29(11), 1505-1512.

Vandewalle, H. t al., "Force-Velocity relationship and Maximal Cycling Power on a Cycle Ergometer Correlation with the Height of a Vertical Jump", *European Journal of Applied Physiology*, 1987, 56, 6650-6656.

R.C. Sprague, *Unpublished Observations*, 2003.

Brooks, G.A. et al., *Exercise Physiology*, 3$^{rd}$ Ed., 2000.

Saltin, B. et al., "Maximal Oxygen Uptake in Athletes", *Journal of Applied Physiology*, 1967, 23, 353-358.

Franklin, B.A. et al., "ACSM's Guidelines for Exercise Testing and Prescription", 6$^{th}$ Ed., p. 303.

Biewener, A.A. et al., "In Vivo Muscle Force-Length Behavior During Steady-Speed Hopping in Tammar Wallabies", *Journal of Experimental Biology*, 1998, 201(pt11), 1681-1694.

Roberts T.J. et al., "Muscular force in Running Turkeys: The Economy of Minimizing Work", *Science*, 1997, 21:275(5303), 1113-1115.

Alexander, R.M. et al., "The Role of Tendon Elasticity in the Locomotion of the Camel", *Journal of Zoology*, 1982, 198, 293-313.

Alexander, R.M. "Energy-Saving Mechanisms in Walking and Running", *Journal of Experimental Biology*, 1991, 160, 55-69.

Heglund, N.C. et al., "Energetics and Mechanics of Terrestrial Locomotion. IV. Total Mechanical Energy Changes as a Function of Speed and Body Size in Birds and Mammals", *Journal of Experimental Biology*, 1982, 97, 57-66.

Biewener, A.A. et al., "Muscle and Tendon Contributions to Force, Work, and Elastic Energy Savings: A Comparative Perspective", *Exerc Sport Sci Rev*, Jul. 2000, 28(3), 99-107.

Taylor, C.R. et al., "The Energetic Cost of Generating Muscular Force During Running", *Journal of Experimental Biology*, 1980, 86, 9-18.

Cavagna, G.A. et al., "Mechanical Work in Terrestrial Locomotion: Two Basic Mechanisms for Minimizing Energy Expenditure", *American Journal of Physiology*, 1977, 233, R243-261.

Holt, K.G. et al., "Increased Musculoskeletal Stiffness During Load Carriage at Increasing Walking Speeds Maintains Constant Vertical Excursion of the Body Center of Mass", *Journal of Biomechanics*, 2003, 36, 465-471.

Balague, F. et al., "Non-Specific Low Back Pain in Children and Adolescents: Risk Factors", *European Spine Journal*, 1999, 8(6), 429-438.

Taimela, S. et al., "The Prevalence of Low Back Pain Among Children and Adolescents. A Nationwide, Cohort-Based Questionnaire Survey in Finland", *Spine*, 1997, 22(10), 1132-1136.

Hong, Y. et al., "Gait and Posture Responses to Backpack Load During Level Walking in Children", *Gait and Posture*, 2003, 7(1), 28-33.

Chansirinukor, W. et al., "Effects of Backpacks on Students: Measurement of Cervical and Shoulder Posture", *Australian Journal of Physiotherapy*, 2001, 47(2), 110-116.

Pascoe, D.D. et al., "Influence of Carrying Book Bags on Gait Cycle and Posture in Youths" *Ergonomics*, 1997, 40(6), 631-641.

Hong Kong Society for Child Health and Development. "The Weight of School Bags and its Relation to Spinal Deformity", Hong Kong: The Department of Orthopedic Surgery, University of Hong Kong, The Duchess of Kent Children's Hospital, 1988.

Good, J.A., "Effects of Controlled Vertical Motion in Load Carriage Systems", Queen's University Kingston, Ontario, Canada, Sep. 2003, 185 pages.

* cited by examiner

BACKPACK FOR HARVESTING ELECTRICAL ENERGY DURING WALKING AND FOR MINIMIZING SHOULDER STRAIN

CROSS-REFERENCE TO RELATED APPLICATIONS

This application is a divisional of U.S. Ser. No. 10/803,112, filed Mar. 17, 2004, now U.S. Pat. No 6,982, 497 which claims benefit to Provisional Application Ser. No. 60/455, 477, filed Mar. 17, 2003, the entire contents of which are herein incorporated by reference.

GOVERNMENT SUPPORT

This invention was made with government support under N00014-03-1-0568 awarded by the Office of Naval Research and under Grant Nos. AR38404 and AR46125 awarded by the National Institutes of Health. The government has certain rights in the invention.

FIELD OF THE INVENTION

The present invention relates to ergonomically designed backpacks and, in particular, to backpacks that permit the wearer to generate electrical energy from the mechanical energy created by movement of the backpack during walking.

BACKGROUND OF THE INVENTION

Man has become more dependent on technology in all arenas of life. The ubiquitous use of mobile technologies requires that constant electrical power, presently provided by batteries, is available. Total dependence on batteries is problematic because short battery lifespan requires larger batteries, and battery weight can become a significant issue. In the case of the military, carrying batteries becomes a backbreaking load (packs weigh in excess of 80 lbs) which limits the time soldiers can remain in the field. A device that could generate significant electrical energy to recharge batteries while one is on the move, would provide greater freedom and operational ability.

Energy "harvesting" from body movements requires the capture of mechanical energy and conversion into electrical energy. The key requirement for many electrical energy-generating technologies, such as electroactive polymers, is the ability to produce movement against a load (i.e., provide the mechanical work that will be converted to electrical energy). Up to now, attempts to extract such energy have been extremely limited in terms of wattage (i.e., 10-20 milliwatts). For example, a watch that stays powered by arm movements generates on the order of only a few thousandths of a watt or less. Because the work done by muscles during locomotion is generally inaccessible, most attempts at harvesting mechanical energy have focused on harvesting energy from shoes by, for example, placing piezoelectric devices in shoes. For example, Drake describes such a device in "The Greatest Shoe on Earth," Wired, February 2001, pp. 90-100. Unfortunately, the only place that is relatively accessible, the foot, is a relatively poor location for extracting mechanical energy because very little mechanical work is done at the foot during locomotion.

More recently, Pelrine et al. suggested in published U.S. patent application Ser. No. 2001/0035723 that electroactive polymer devices could be used to generate electrical energy by converting mechanical energy generated during by heel strikes during walking into electrical energy. Pelrine et al. also suggested that such polymer devices may be used to convert the up and down motion of a backpack into electrical energy. However, Pelrine et al. offer no suggestions as to how to design such a backpack device. Pelrine et al. also do not recognize that a suspended load leads to controlled up/down movement and reduced stress on the wearer's shoulders as well as on the rest of his or her body.

Accordingly, there remains a strong need to develop a device capable of harvesting energy on the order of watts, particularly for military applications.

Heavy backpack loads are known to lead to spinal injuries, particularly in children. Many school districts encourage parents to purchase spare sets of books for their children to minimize the weight of backpack loads. Of course, this approach is quite expensive. Recently, wheels have been added to backpacks so that the backpacks may be pulled along the ground, thereby reducing the load on the user's back. Such designs are problematic since they do not provide much assistance when the user has to cross grass or more difficult terrain. An improved way to reduce load on the wearer's back is desired.

Another recent approach to the problem of heavy backpacks is suggested by Duckworth in U.S. Pat. No. 6,619,523, whereby a shock absorber system is applied to the backpack to take the jolts out of hitting the ground. In particular, a damper (air piston) is added to the frame of the backpack to reduce the movements of the load with respect to the pack frame. Unfortunately, Duckworth did not address the physics of walking or running with a backpack and simply built classic shock absorbers. Their springs are too short in length and too stiff to permit the large relative movements between the frame and the load which are necessary to keep the load relatively still with respect to the ground. Accordingly, rapid movement with the backpack taught by Duckworth would cause the generation of a very large force which would limit the relative movement between the load and the frame resulting in high shoulder loading as well as potentially causing the wearer to lose his or her balance.

Accordingly, there remains a strong need to develop a device capable of minimizing load stresses on the shoulders on the wearer of a conventional backpack. The present invention is designed to address these needs in the art.

SUMMARY OF THE INVENTION

Based on a biomechanical analysis, the present inventor has developed a strategy and device (suspended-load backpack) that can produce large forceful movements. These movements, when coupled with artificial muscle energy-generating or other mechanical energy to electrical energy conversion technologies in accordance with the invention permit the generation of several watts of electrical energy during normal walking movements. The backpack is designed to permit the load to move relative to the backpack frame during walking so that the large movements between the load and the frame of the backpack during walking can be transferred to a motor through, for example, a rack and pinion gear, to convert the mechanical movement to electrical energy. The movement may also be converted to electrical energy by using an electroactive polymer (EAP) (or other artificial muscle technologies) to connect the suspended load to the frame. These large movements of the load also reduce the absolute vertical motion of the load with respect to the ground. In particular, because the hip (and thus the pack frame) go up a down a good deal during walking (and even more during running) with a fixed load, large accelerations are necessary that exert large forces back on the shoulders and other parts of the body. The large relative movement between the frame and the load noted above reduces the absolute vertical excursion of the load and thus the locomotion induced increase in force. To facilitate this function, such designs not only allow the load to make large movements but to move in a controlled fashion. This prevents the wearer from losing his or her balance as the load moves up and down along the backpack frame, and extends human performance by permitting the wearer to run with heavy loads.

BRIEF DESCRIPTION OF THE DRAWINGS

The above and other objects and advantages will become apparent to one skilled in the art based on the following detailed description of the invention, of which.

DETAILED DESCRIPTION OF ILLUSTRATIVE EMBODIMENTS

Figure 1:
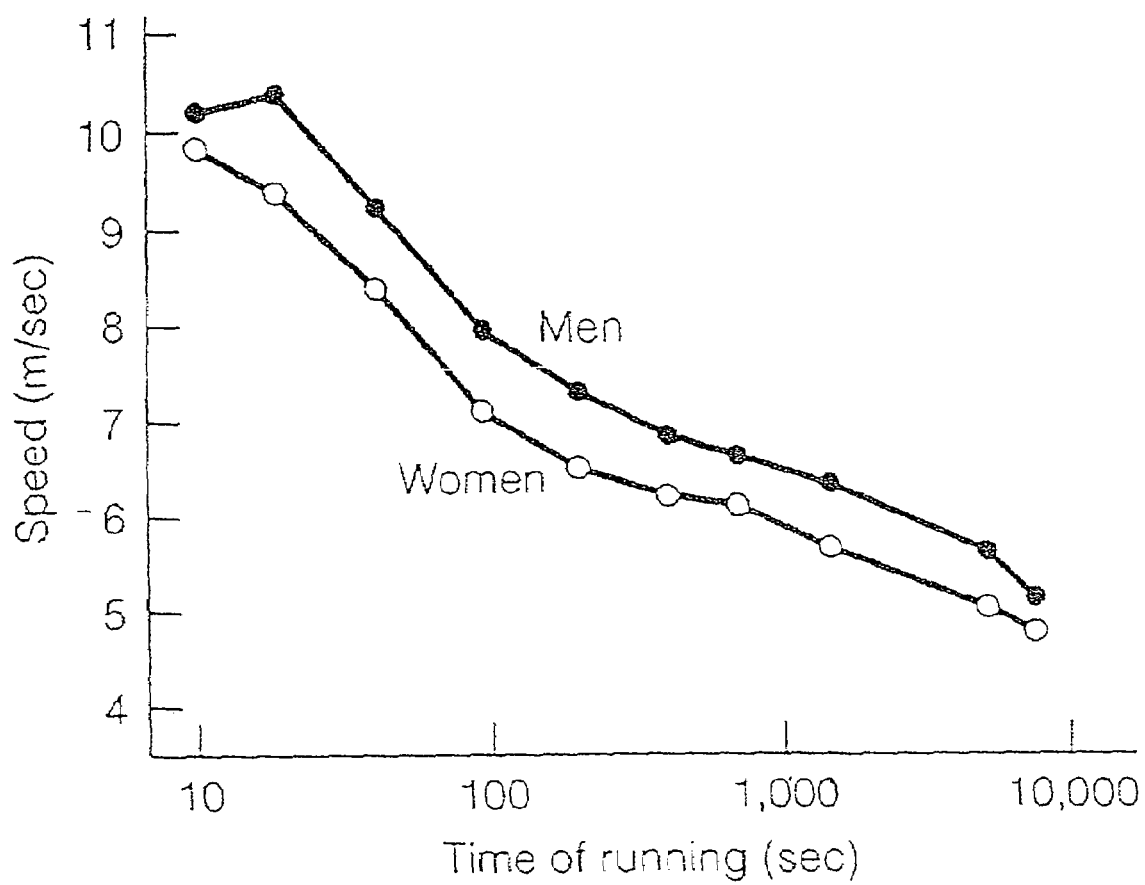
FIG. 1 illustrates the average running speed maintained over time of event for world records, illustrating how running performance drops as the duration of the event increases.

A detailed description of illustrative embodiments of the present invention will now be described with reference to FIGS. 1-18. Although this description provides detailed examples of possible implementations of the present invention, it should be noted that these details are intended to be exemplary and in no way delimit the scope of the invention.

Analytical Background for Suspended-Load Backpack

To better understand the design considerations for the backpack of the invention, the energetics and mechanics of human movement with a view of choosing a means of extracting mechanical energy that can be subsequently used for electrical conversion will be described. The design considerations will then be applied to a suspended-load backpack in accordance with the invention so as to effectively make the mechanical energy generated by the load movement accessible for conversion to electrical energy. How the backpack of the invention also may reduce shoulder forces that, in turn, reduce orthopedic problems as well as extend human performance by permitting the carriage of greater weights at much faster speeds (i.e., running) also will be discussed below.

Limits of Human Performance

Human performance has been studied extensively for decades, so as a first step it is useful to ascertain how much energy is available for harvesting. The values vary greatly depending on the duration of performance as well as what proportion of the subject's muscle mass is included in the activity (i.e., activities which use a greater proportion of the muscle mass naturally can generate more power).

Muscle is a biochemical machine which takes high energy compounds (fat, carbohydrates and-proteins) and breaks them into lower energy compounds: $CO_2$ and $H_2O$. Some of the energy released in this process is captured in the form of ATP, which in turn, is the immediate fuel used by the muscle $Ca^{2+}$ pumps and muscle cross-bridges. The cross-bridges, in turn, can use the energy in the ATP to perform mechanical work. The fact that there are three points at which energy can be measured (total energy, energy in the ATP, and the amount of mechanical work performed) and that two efficiencies can be determined (mechanical power output/total energetic cost or mechanical power output/energy stored in the ATP utilized) can lead to some confusion. As a rough guideline, approximately half of the chemical energy that is liberated in the breakdown of metabolites is captured in the form of ATP and the rest is liberated as heat. Further, a maximum of about 50% of the energy stored in the high energy phosphate bond in ATP can be converted to mechanical power. However, this value is highly variable and depends on the activity in which the muscle is engaged—i.e., if muscle generates force isometrically and thus does not shorten, then no external work is done and the efficiency is zero. Hence when describing the efficiency of mechanical power generation in term of the energy contained in the bonds of the metabolites, the maximum value is approximately 25%. Note that although this seems low compared to some artificial muscles, this is misleading. The 25% value is equivalent to calculating the efficiency of an electric motor by going back to the energy in the coal that is burned to generate the electricity in the first place.

Short Duration—Maximal Performance

Man is capable of generating large amounts of power for a short period of time. For example, a well-trained cyclist can generate in excess of 1200 W of power over one half-crank revolution. The amount of power a person is capable of generating for short periods depends on the amount of muscle mass being recruited. In the case of cycling, lean thigh mass is a good predictor of maximal short-term power. Since college-aged males tend to have smaller lean thigh mass than well-trained cyclists, they will typically generate less power over a short period (i.e. 800-1200 W) while elite sprinters, with large lean thigh volumes, will exceed 2000 W. Other modes of exercise incorporating a greater amount of lean body mass will yield higher short-term power outputs. For example, elite rowers can average greater than 2000 W of power generation over the drive phase of one stroke. In this whole body motion, maximal power is correlated to total lean body mass. It is likely that muscle efficiency at these maximum power outputs, would be reduced to 10 or 15%; however, for technical reasons, it is very difficult to measure. Indeed, if it is reduced to 10%, then when the athlete is generating 1500 W of mechanical work, the total energy utilized would be an extraordinary value of ~15,000 W.

If even a tiny fraction of the total energy could be converted into electricity, this would be a very large source of electrical power. Unfortunately, there are two prohibitive facts. First, there is not an easy technology to convert heat into electricity from the small heat gradients in the body. Second, this level of athletic activity can only be maintained for 5 to 10 seconds.

Sustainable Power Output

The reason that this maximum level of performance cannot be sustained for long periods is that ATP cannot be generated fast enough. Even if there is a significant reduction in the performance level, where ATP can in fact be generated, this can only be done anaerobically and thus on the order of only minutes, as shown in FIG. 1. To break carbohydrates down to $CO_2$ and $H_2O$, oxygen is necessary. If sufficient $O_2$ cannot be delivered, then the carbohydrates must be broken down anaerobically to lactic acid. When lactic acid builds up, it causes the muscle to become more acidic, thereby reducing the force production and causing fatigue. Hence, the generation and build up of lactic acid sets the limits for sustainability in high intensity exercise. Over the course of several hours, for an elite cyclist, the lactate concentration is mostly dependent upon lactate threshold. Professional cyclists typically have a $VO_2$max of around 5.2-6.0 L/min and a lactic threshold of around 80-85% $VO_2$max. Using the ACSM equation (which is an empirical equation relating oxygen consumption to mechanical work production), one would expect a sustained mechanical power output of 320-410 W, which is in fact about what an elite cyclist would hold for a long time trial. For average college aged males, the lactate threshold would occur at about 150-200 W. Which also constitutes a very high level of activity.

Walking Metabolism

It is clear that when carrying large loads (e.g. 80 pounds), walking will be the preferred mode of movement. For walking at various speeds, the oxygen cost varies with walking speed (and body weight and the load carried). The value of total metabolism ranges from 200-350 W. It is difficult to ascertain how much mechanical work is done during walking, because unlike sprinting (where there is acceleration), or cycling and rowing (where mechanical work is being performed against the crank or a lever system), measurement of mechanical work performed during walking is complicated to assess.

Mechanics and Work Production During Walking

Terrestrial locomotion is fundamentally different than locomotion through a fluid. In fluids, the environment does work on the body moving through it (by the force of drag) and the animal must perform mechanical work on the environment (by the force of thrust). In terrestrial locomotion, the environment does no work on the body except for the small force of aerodynamic drag which is tiny during human movement. Conversely, humans do no work on the environment (i.e., there is no significant wake or vortices or an increase in temperature left behind).

When running, the mechanical energy (based on measurement of the kinetic and gravitational potential energy of the body) stays essentially constant during the aerial phase (i.e., there is transfer between kinetic energy in the vertical plane and gravitational potential energy as the height of center of mass (COM) changes). However, the mechanical energy (sum of kinetic and gravitation potential) declines when the foot makes contact with the ground. This loss of mechanical energy is accomplished by negative work performed by the muscle-tendon complexes distributed around the joints. At takeoff, this energy must be placed back into the mechanical system so that the animal has the same level of mechanical energy as it did before it hit the ground. The source of this mechanical work depends on the fate of the mechanical energy absorbed during the deceleration. If it was lost as heat, then the muscle must perform mechanical work de novo, to reaccelerate and add an increment of mechanical energy to the body. If the mechanical energy is stored in the stretch of elastic structures (tendons, muscle, ligaments), then this stored elastic energy can be put back into the system by the muscle-tendon complex performing positive work. Determining how much of the energy increment is lost as heat or is stored as elastic energy and recovered during lift off, is difficult to measure. There have been superb experiments involving a determination of the force on and the strain of the tendons during the contact phase that suggest that in man a great deal of the energy can be stored and recovered, and hence the contractile element of the muscle does not have to perform as much de novo mechanical work as it would otherwise and thus uses less energy.

Figure 2A:
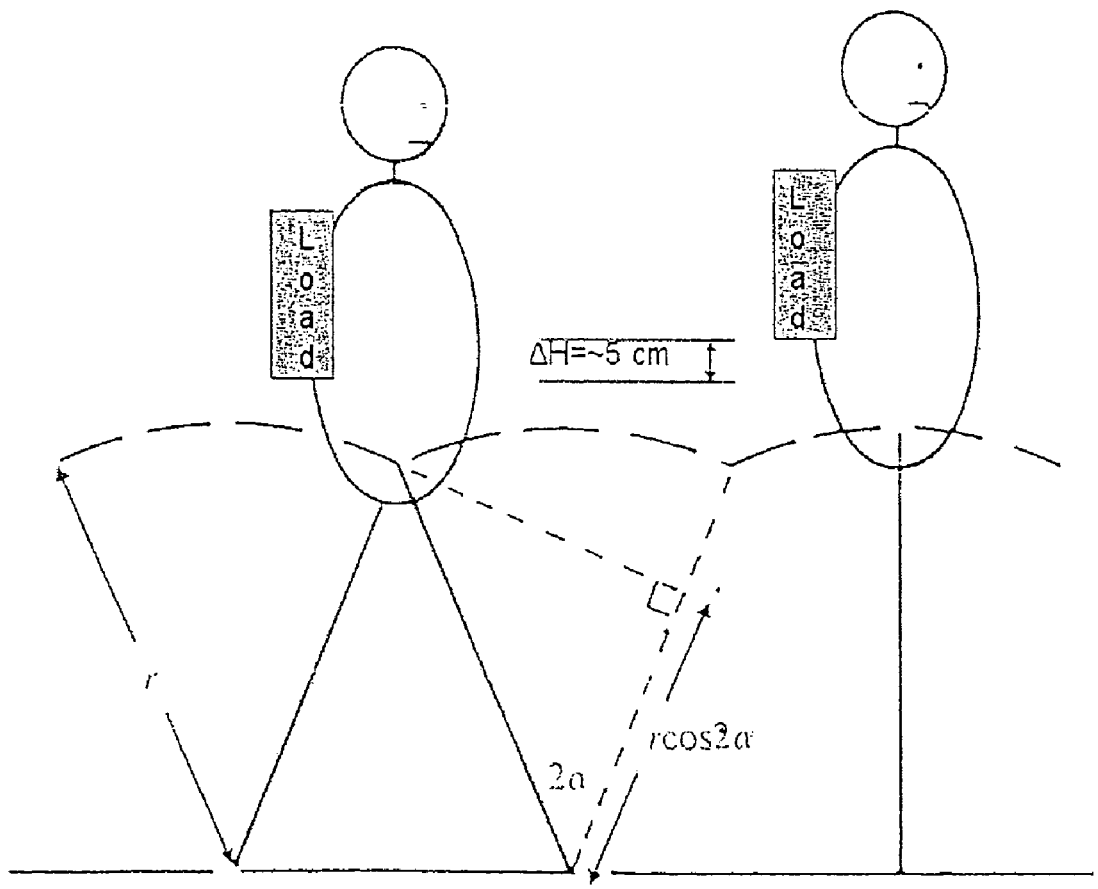
FIG. 2a illustrates that, while walking, a person's movement is like an inverted pendulum: one foot is put down, then the body vaults over it, then the back foot is brought forward and put down, and then the body vaults over that one. As the load in a conventional backpack is tightly secured to the torso, the load must rise and fall about 5 cm as the person walks, resulting in large changes in mechanical energy.

Walking, of course, is energetically less costly than running, and this is in large part due to the fundamentally different mechanism for mechanical energy transfer employed during walking. While walking, a person's movement is like an inverted pendulum: one foot is put down, then the body vaults over it, then the back foot is brought forward and put down, and then the body vaults over that one as shown in FIG. 2a. Although the hip and center of mass go up and down 4-5 cm, mechanical energy is transferred between gravitational potential energy and kinetic energy, hence in theory very little de novo mechanical work needs to be done by the muscles. Muscles, of course, are required to perform mechanical work to swing the legs forward and to add increments of mechanical energy inevitably lost to energy transfer inefficiencies and friction. In addition, one still needs the muscles to generate force and hold the leg relatively rigid as the subject vaults over it. Generating force, however, is energetically less expensive than performing mechanical work and, accordingly, walking is energetically cheaper than running.

Extracting Mechanical Energy Out of Human Locomotion

One result from the preceding analysis is that almost all of the mechanical work is done inside the body (rather than on the environment). This makes it exceedingly difficult to extract some of the mechanical energy to drive the electrical energy conversion apparatus because the device would need to either be placed in the body (which is difficult and certainly undesirable) or attached to the outside of the body (i.e. like an exoskeleton or kneepad) which affects maneuverability and comfort. Therefore, the most obvious place to put a device is in the shoe but, as noted above, this approach has permitted only small levels of electrical energy generation. The chief reason for this limitation is that essentially no work is done at the foot-ground contact point, and thus there is very little mechanical energy which can be extracted.

This can be clearly appreciated when observing the contact between the boot and the ground. Although very large forces can be generated, very little work (F·d1) is done because under normal circumstances the point of force application does not move (i.e., d1=0). One can artificially try to make the system perform work by making the boot compliant (and hence have the foot move a small distance in the shoe by compressing the sole underneath it or by placing a sole plate which is deformed as one moves from heel strike to toe off. In both of these cases, this distance (and hence the mechanical energy available for extraction) is limited because as the boots become more and more compliant, it affects the subject's ability to move and maneuver.

The inventor's analysis of humans walking with backpacks, however, has yielded a possible mechanism for extracting mechanical energy. Although the large load in the backpack represents a significant problem for the subjects carrying it, the present inventor viewed the load in the backpack as an opportunity to harness mechanical energy and developed a way to extract some mechanical energy from the load's movement for eventual conversion to electricity.

As mentioned above, while walking, a person's movement is like an inverted pendulum: one foot is put down and then vaults over it causing the hip to cycle up and down 4-5 cm. Any object rigidly attached to the body also has to move up and down. Thus, if one is carrying a load in a backpack, because it is fixed to the body it has to go up and down that same vertical distance (FIG. 2a). A considerable amount of mechanical work is done if the load is heavy. In the case of an 80 lb load (36 kg), for example, 18 J of energy accompanies each step assuming a 5 cm displacement. This mechanical energy is also inaccessible if the load is rigidly attached to the body. The goal of the inventor, therefore, was to decouple the movement of the load with respect to the body so that the differential movement created between the load and the body could be used to drive electrical generation technology that converts the mechanical movement into electrical energy.

Figure 2B:
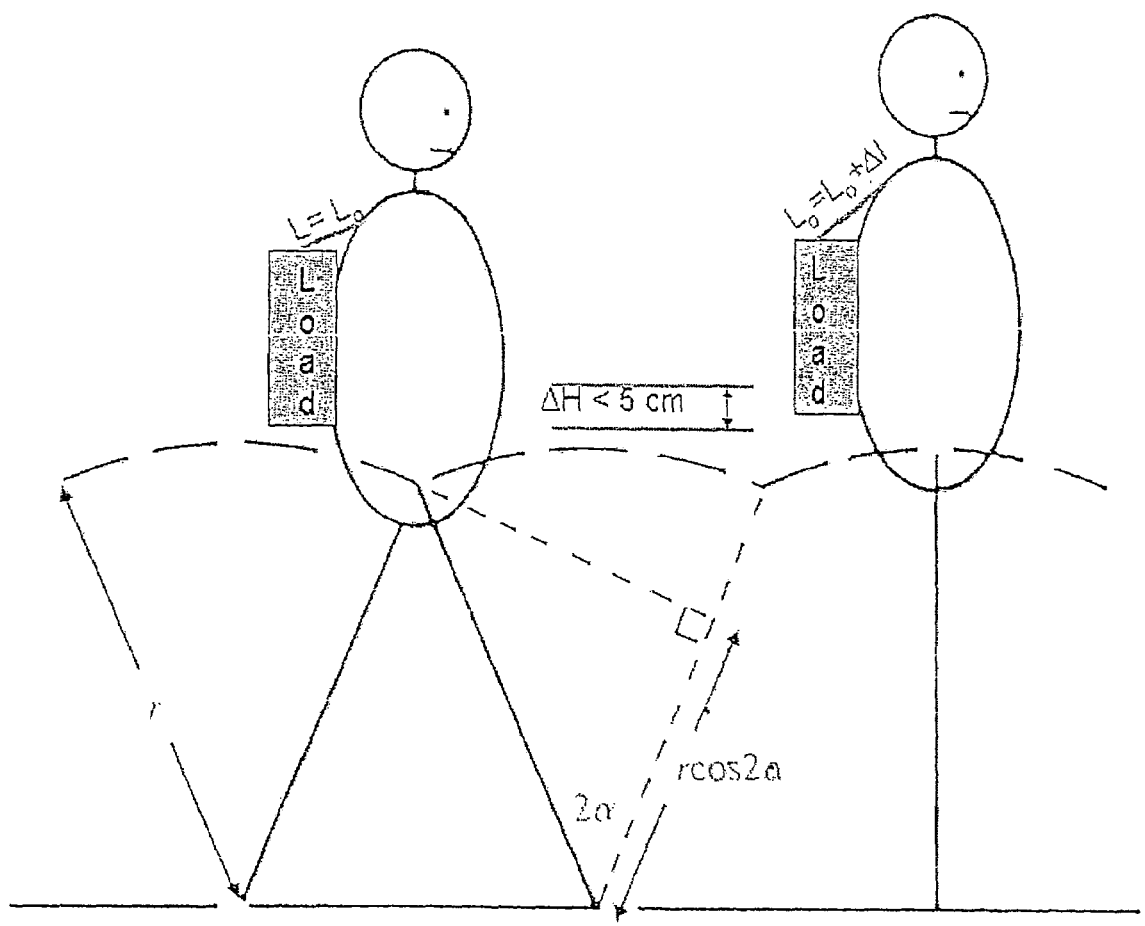
FIG. 2b illustrates the use of compliant shoulder straps by which the load can move with respect to the torso, thereby reducing the vertical movements of the pack and the amount of mechanical work that must be done to move it.
Figure 3:
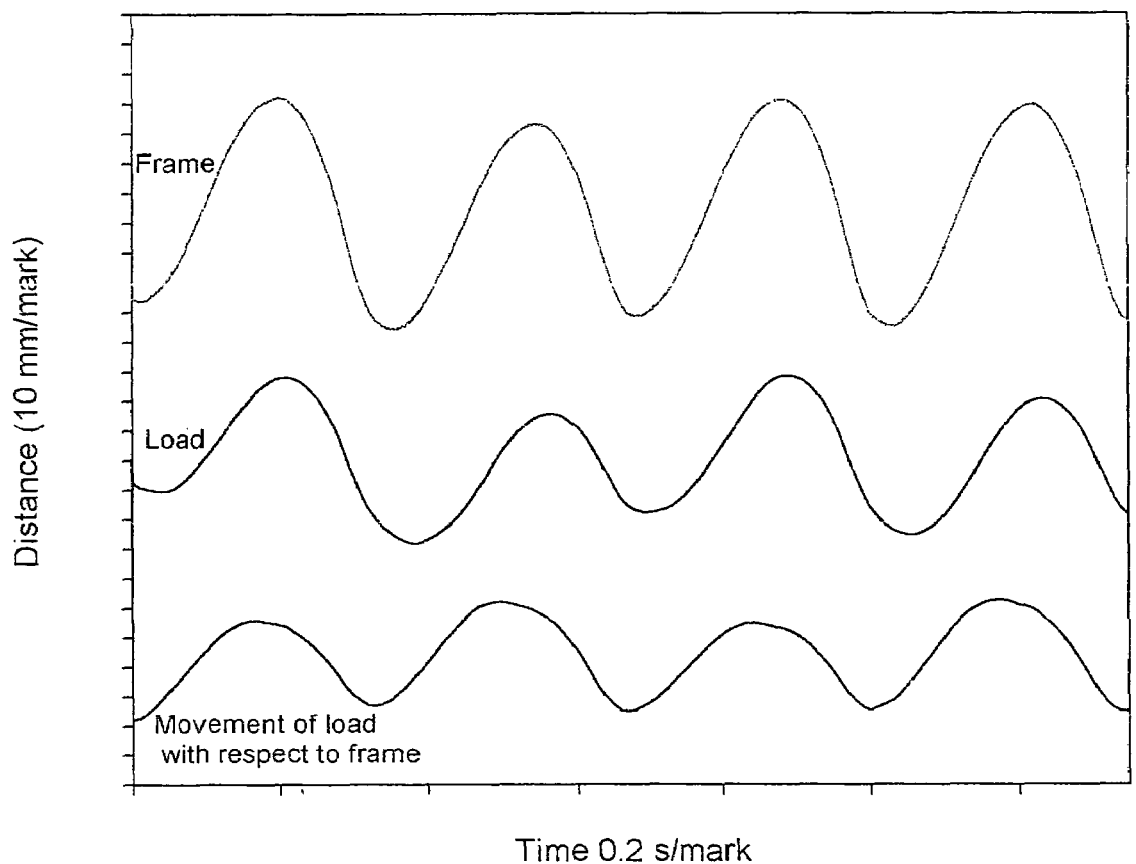
FIG. 3 illustrates how the suspended-load backpack allows for large movement of the load with respect to the frame and thereby reduces the vertical movement of the load with respect to the ground. This in turn leads to the reduction in forces on the shoulders of the wearer while running wearing the backpack of the invention.
Figure 4:
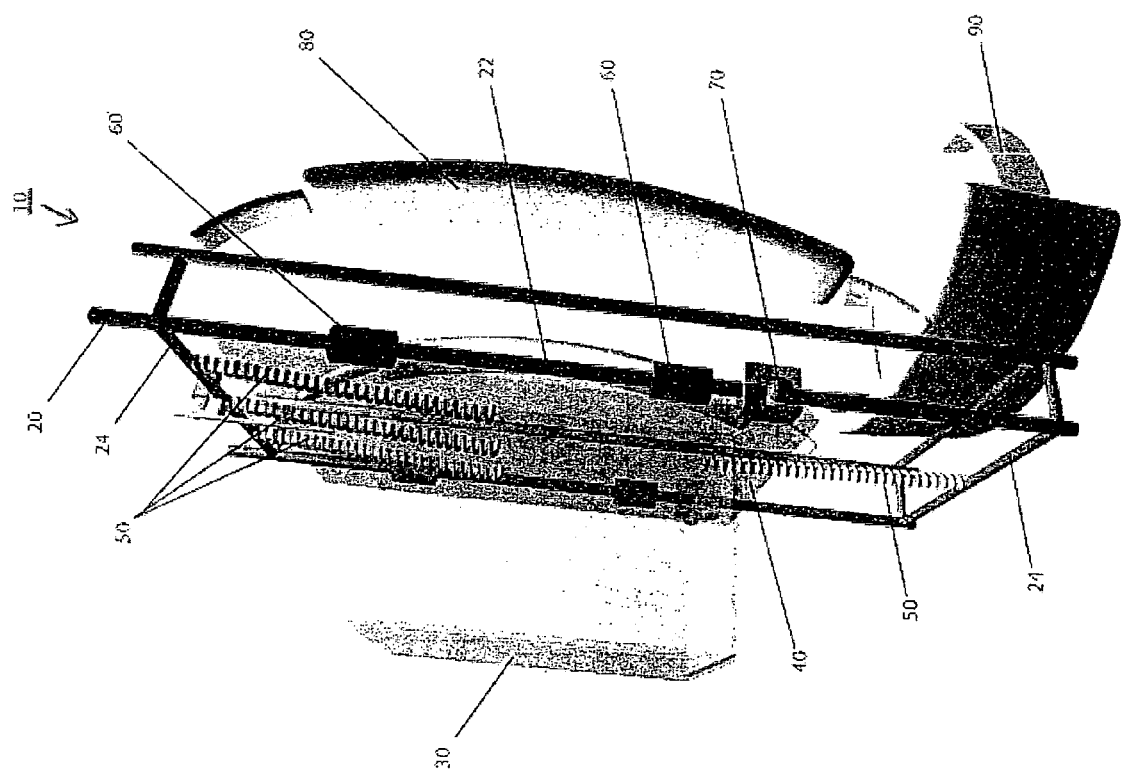
FIG. 4 illustrates a rear perspective view of a first embodiment of a suspended-load backpack in accordance with the invention.

The simplest approach is the use of compliant shoulder straps as shown in FIG. 2b. However, the differential movement might cause the backpack to rub on the hips, back and shoulders of the wearer and thus cause discomfort. Also, the friction will prevent the backpack from moving through the full range of movement (i.e., <5 cm). An alternate solution is proposed in accordance with the invention whereby the pack frame is fixed to the body as in a normal pack, but instead of fixing the load to the pack frame, the load is suspended from the frame so that the load would still be decoupled from the body. As illustrated in FIG. 3 and described in more detail below, the movement of the load with respect to the frame reduces vertical excursion of the load with respect to the ground and in turn reduces the forces on the wearer's shoulders. A design of such a suspended-load backpack is illustrated in FIG. 4 and is described in more detail below. During walking, the load in this backpack rides up and down on bushings constrained to vertical rods. Hence, the load is free to move in the vertical direction without danger of swaying. As desired, a lock is also provided to lock the load to the backpack frame to prevent it from moving (as when rock climbing).

The backpack of FIG. 4 enables electrical energy to be harvested while walking wearing the backpack. Depending on step frequency and hip excursion, 17-36 watts of energy may be required to raise and lower the load. Although it is difficult to extract the mechanical energy from the body's change in height of the center of mass, by interposing this device between the body and the load, some of the mechanical energy changes of the load can be captured.

Suspended-Load Backpack Reduces Forces on Shoulders

The present inventor has recognized that wearing the suspended-load pack of the invention reduces peak ground forces and more importantly, reduce forces on the shoulder (FIG. 3). This, in turn, should lead to a reduction in fatigue and orthopedic problems and may permit the wearer to carry greater loads. Further the reduction in force permits much faster movements, thereby making running with loads possible. The reasons for the reduced forces are believed to be the result of the fact that the load in the backpack exhibits controlled movement and does not move as far with respect to the ground.

One usually considers a load only in terms of the force required while standing still. This considerably underestimates the problem. As mentioned above, when one walks or runs, the hips rise and fall, and if the load is rigidly attached to the body, the load has to undergo the same change in height, as illustrated in FIG. 2a. This requires that the load be accelerated upwards on the up-step and hence more force be exerted up on the load. As most loads are carried on the shoulder, this increases the force and pressure on the shoulder. This added pressure can be very large. For instance, Kram, in an article entitled "Carrying Loads With Springy Poles," *Journal of Applied Physiology*, Vol. 71(3), pp. 1119-22 (1991), found that when people run with a weight attached to their shoulders that the peak force on the shoulders is approximately 2-fold higher than the static weight when the person is standing still. As noted by Kram, merchants in Asia often carry loads at the end of long bamboo pools carried over their shoulders. By hanging the loads from springy poles, it was found that as experimental subjects run, the load stays close to the ground and does not undergo the large vertical excursions observed for the center of mass of the person (See FIG. 2). Because it is not necessary to accelerate the load upwards on the up-step, the forces that are generated at the feet and shoulders do not have to increase above that necessary to support the static weight while standing still.

Hence, two important facts are clear: 1) Movement causes the dynamic forces on the shoulders to be much larger than the static forces when standing still. Hence, dynamic forces during walking or running are likely to be an important determinant of orthopedic problems. 2) Suspending the load can reduce the dynamic forces on the shoulders down to the level of the static forces when standing still (i.e., the weight), and hence may be an important avenue for reducing orthopedic injury.

Clearly, any intervention that reduces dynamic force on the shoulders of adults has considerable importance for recreational backpackers and especially the military where load carriage is recognized as a major problem. Likewise as we become increasingly technology-dependent, there is a greater need for carrying laptop computers and even medical devices. Reducing the dynamic forces on the shoulders of the general public, and especially in the elderly, is of considerable interest, as well.

The suspension of backpack loads also represents a potential opportunity to reduce the dynamic loads experienced by school children who carry heavy backpacks. There is significant evidence from numerous studies around the world indicating that children carrying heavy backpacks is a considerable problem and may have potential long-term medical consequences. Back pain is a relatively common symptom among school children and in many the pain is recurrent or chronic even before puberty. Studies by Negrini et al. and reported in "Backpacks On! Schoolchildren's Perception of Load, Associations With Back Pain and Factors Determining the Load," *Spine*, Vol. 27(2), pp. 187-195, 2002, have shown that school backpacks are felt to be heavy by 79% of children, to cause fatigue by 65.7%, and to cause back pain by 46.1%. In addition, numerous studies have shown that in children, carrying weight in excess of 15% of one's body mass (which they almost always do), can lead to significant increase in trunk inclination, abnormal standing posture while carrying the load, as well as muscle soreness, back pain, numbness, shoulder pain, and even spinal deformities.

Based on the forgoing explanation of the physics of load carrying with poles and the physical problems found in children, suspending the load in a compact package (i.e., suspended-load backpack) represents an important contribution to solving this problem.

Embodiments of Suspended-Load Backpack for Electricity Generation

Suspended-Load Backpack for Electricity Generation

Suspension of the load permits generation of electricity for the purpose of powering devices in real time or charging batteries or capacitors for later use. Springs or an elastic sheet or cord with the appropriate spring constant are used to suspend the load compartment from the frame of the backpack. Electricity can be developed by driving an electric motor so that it becomes an electricity generator. The up-down movement of the load is transferred to the electric motor using either a lever or a rack and pinion to facilitate energy generation. The electric motor, in turn, produces current of alternating polarity that is rectified by a rectifying circuit with capacitive filtering. The output of the rectifying circuit provides charge to a battery charging unit mounted in or on the backpack. The electric motor also can be driven by hand by first disengaging the normal drive mechanism and either using the lever (FIG. 6b) or a gear handle (FIG. 7) so that devices can be used (or batteries charged) when not walking with the backpack (either in inclement weather, at night, or under fire, as in military use). As will be explained below, the motor may be replaced by electroactive polymers (EAPs), as appropriate, to generate electricity.

Figure 5:
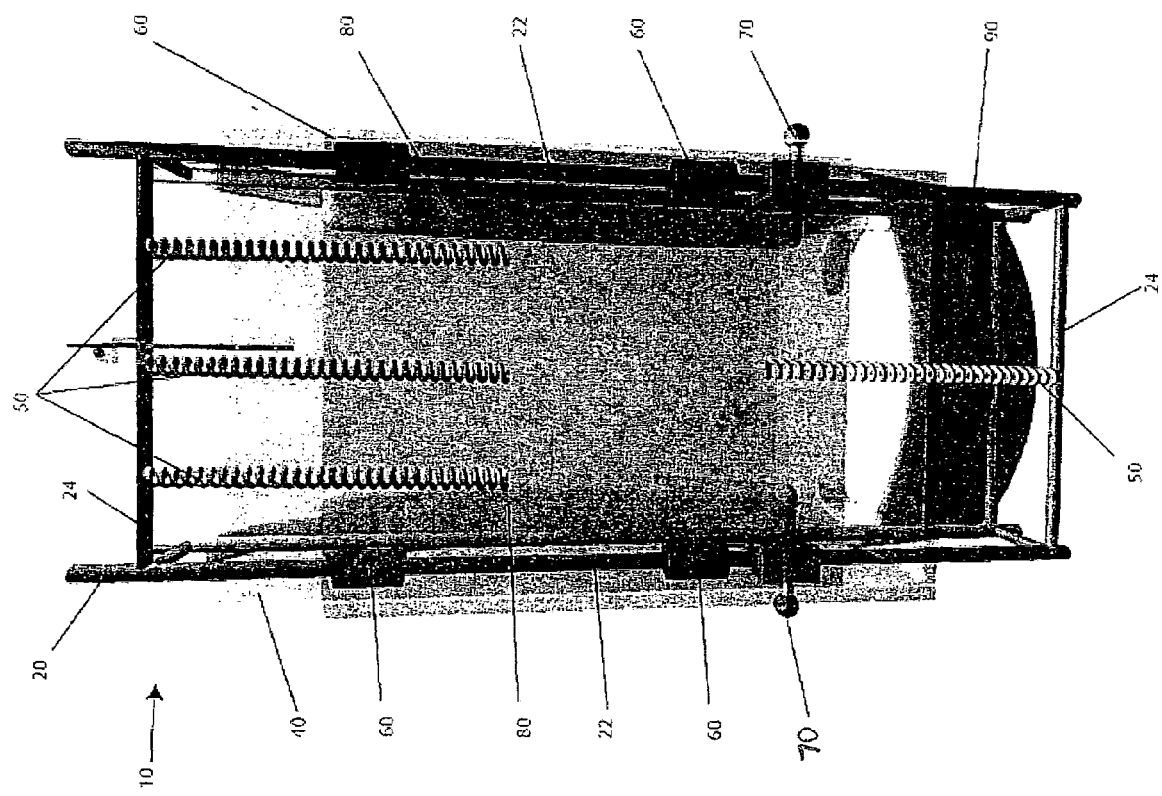
FIG. 5 illustrates a rear view of the suspended-load backpack of FIG. 4 without the load.

FIGS. 4 and 5 illustrate a rear perspective view of a first embodiment of a suspended-load backpack 10 in accordance with the invention. As illustrated, backpack 10 includes a frame 20 including vertical rods 22 and horizontal bars 24. In an illustrative embodiment, rods 22 are made of hardened chrome plated shafts having ½ inch diameters while bars 24 are made of aluminum. Frame 20 supports a suspended load 30 which may be in the form of a box or satchel connected to a load support structure or (e.g., aluminum) plate 40 suspended with respect to the frame 20. In the embodiment of FIGS. 4 and 5, the load support structure 40 is supported with respect to frame 20 in the vertical direction by extension springs 50 (e.g., nickel plated steel with 2:1 extension and 5.2 lbs/in. spring constant) that have spring constants selected to support the desired load rating for the suspended load 30. A fourth identical extension spring pulls down on plate 40, thereby providing a restoring force. Although three springs 50 are illustrated for connecting the load support structure 40 to the bar 24 of frame 20, those skilled in the art will appreciate that one or more springs 50 may be used to support the load 30. Load support structure is laterally stabilized with respect to frame 20 by a plurality of bushings 60 that ride up and down on rods 22. In an illustrative embodiment, four bushings 60 are provided (one on each corner of the load support structure 40) for stability, and each bushing 60 comprises a self-aligning linear ball bearing with an inner diameter (e.g., ½ inch) designed to ride upon rods 22. The combination of springs 50 and bushings 60 permits load support structure 40 and suspended load 30 to move up and down with respect to frame 20 as the wearer walks, without rubbing the wearer.

As illustrated in FIGS. 4 and 5, a locking mechanism 70 may be included on one or both sides of the frame 20 to permit the wearer to lock the load support structure 40 (and hence load 30) in place to prevent movement, as when the wearer needs to move in a manner which does not allow for shifting of the load (e.g., rock climbing). Locking mechanism 70 may be a split block clamp with a locking knob. Preferably, the locking mechanism 70 is made of a sufficiently strong material (e.g., PVC or nylon) to clamp the load support structure 40 to prevent movement. As illustrated, the frame 20 with the suspended load 30 and its support structure is worn by the user by inserting his/her arms through shoulder straps 80 and attaching waist belt 90.

Figure 6A:
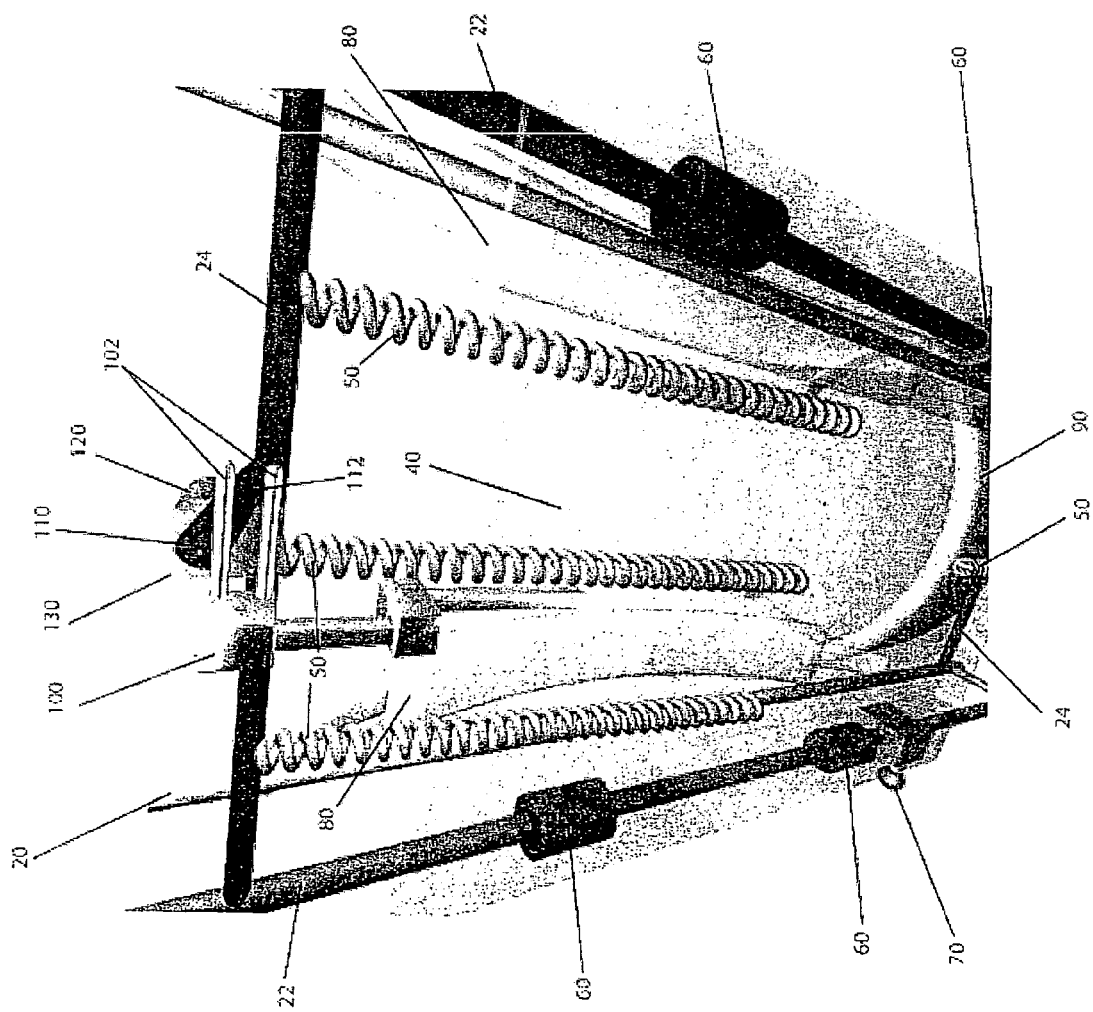
FIG. 6a illustrates a first embodiment of a mechanism for transferring mechanical movement to an electric motor using a lever.
Figure 6B:
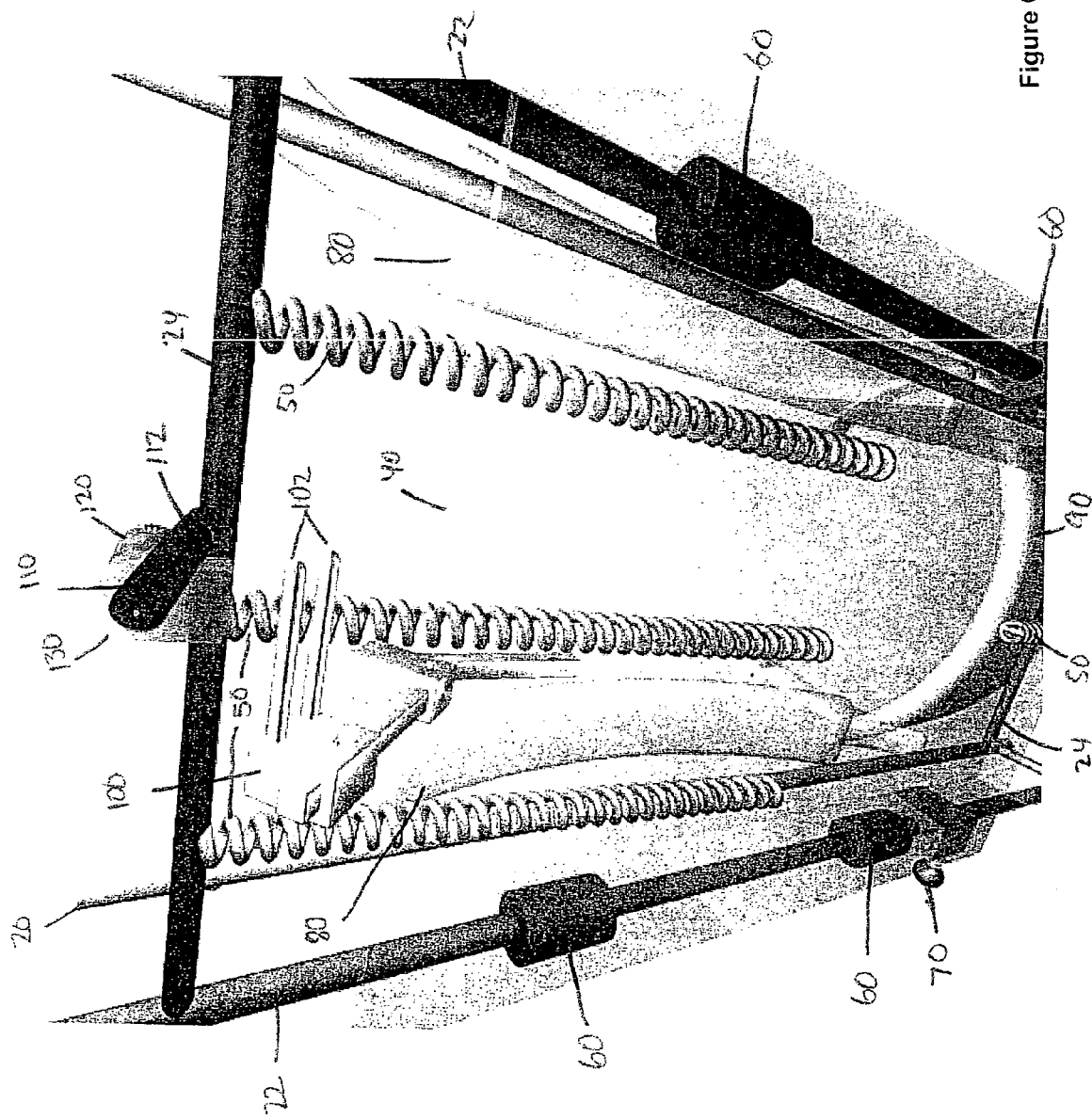
FIG. 6b illustrates the mechanism of FIG. 6a bent back to permit the user to hand crank the motor.

FIG. 6a illustrates the backpack of FIGS. 4 and 5 with a first embodiment of a mechanism for transferring mechanical movement of the suspended load 30. As noted above, the suspended load 30 moves up/down with load support structure 40 on bushings 60 as the wearer walks. Springs 50 have spring constants sufficient to permit controlled movements of the suspended load 30 and load support structure 40. In the embodiment of FIG. 6a, the up/down movement of the load support structure 40 is transferred via a lever actuator structure 100 including lever handle control bars 102 to a lever 110 including lever pin or knob 112. In particular, as the load support structure moves up and down, lever handle control bars 102 crank the lever knob 112 up and down so as to crank gears that, in turn, crank the gears of a DC servo motor 120. In an illustrative embodiment, DC servo motor 120 may be a GT-025 servo motor available from Dynetic Systems. This motor includes a 25:1 inline planetary gear head. As illustrated, the DC servo motor 120 is connected to bar 24 of frame 20 by a support plate 130. As illustrated in FIG. 6b, the lever actuator structure 100 may fold away from the motor 120 and lever 110 to permit the wearer to access the lever 110. As a result, the wearer may crank the lever 110 to generate electricity when the backpack 10 is not being worn.

Figure 7:
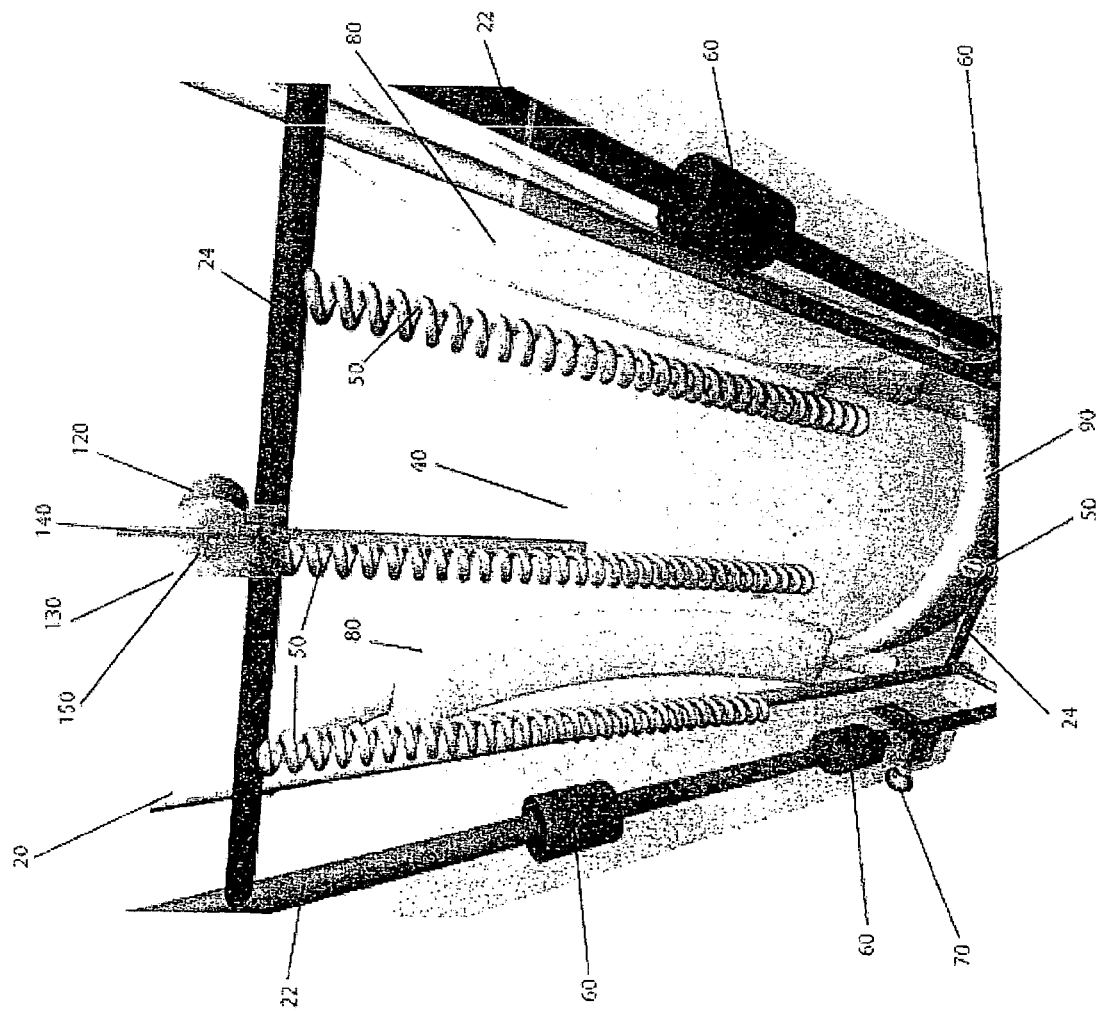
FIG. 7 illustrates a second embodiment of a mechanism for transferring mechanical movement to an electric motor using a rack and pinion.
Figure 8A:
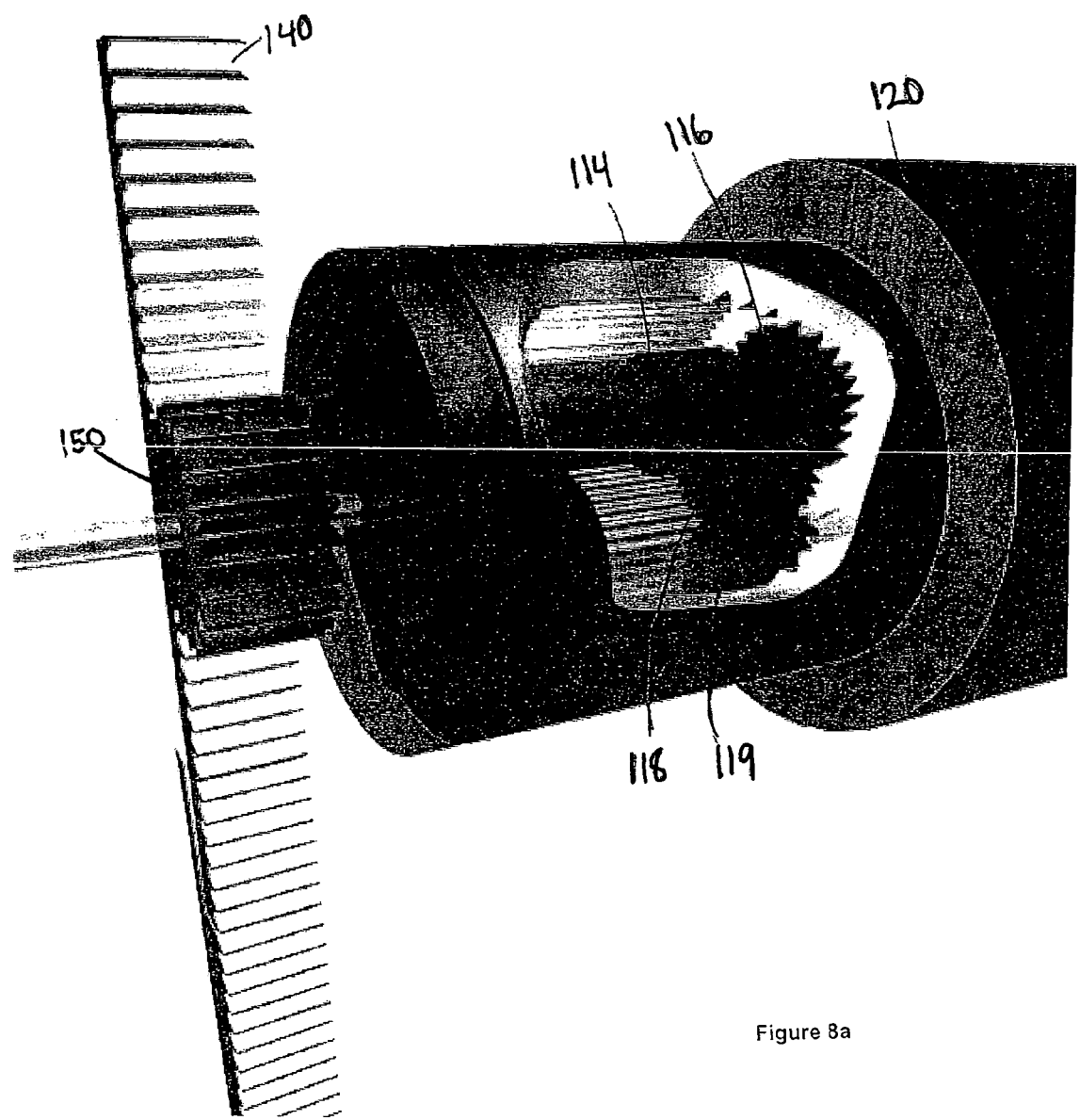
FIG. 8a illustrates the motor gears in more detail.
Figure 8B:
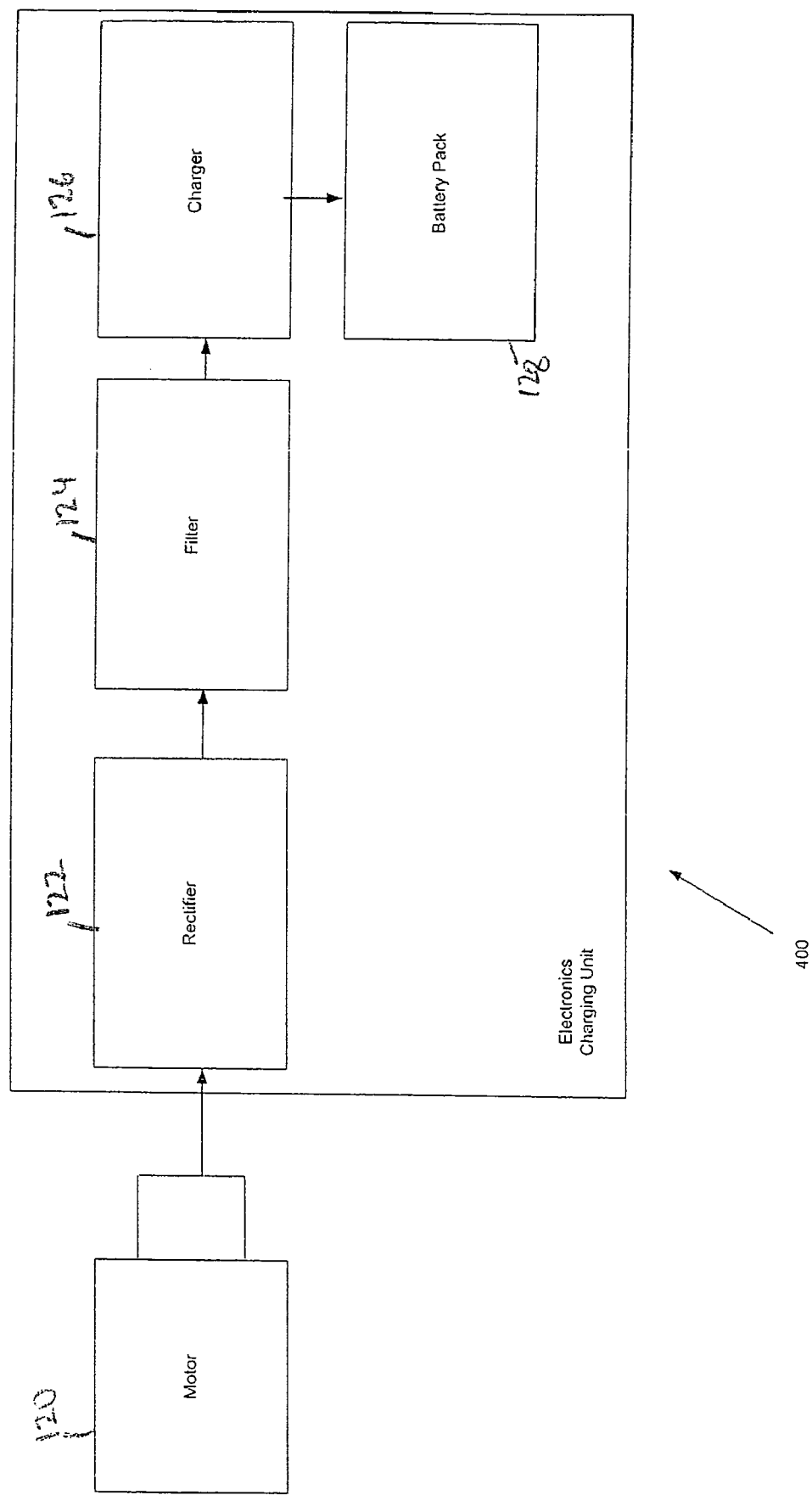
FIG. 8b illustrates the battery charger circuit.

FIG. 7 illustrates a second embodiment of a mechanism for transferring mechanical movement to a DC servo motor 120 where the lever crank mechanism is replaced by a rack 140 connected to load support structure 40 and a corresponding pinion gear 150 connected directly or through gear linkages to DC servo motor 120. As in the embodiment of FIG. 6a, the rack 140 may fold away from the pinion gear 150 to facilitate access to the pinion gear 150 for manual cranking of the DC servo motor 120, as when the user is resting. FIG. 8a illustrates the mechanism of FIG. 7 in more detail. As illustrated, the up/down movement of the rack 140 with respect to the pinion gear 150 turns gears 114, 116, 118, and 119 so as to transfer energy to DC servo motor 120. As shown in FIG. 8b, the output of DC servo motor 120 is provided to an electronics charging unit 400 where it is rectified by a rectifier 122 and filtered by a capacitive filter 124 before being provided to a battery charger 126 for recharging batteries in battery pack 128 as well as electrical components, and the like.

Figure 9:
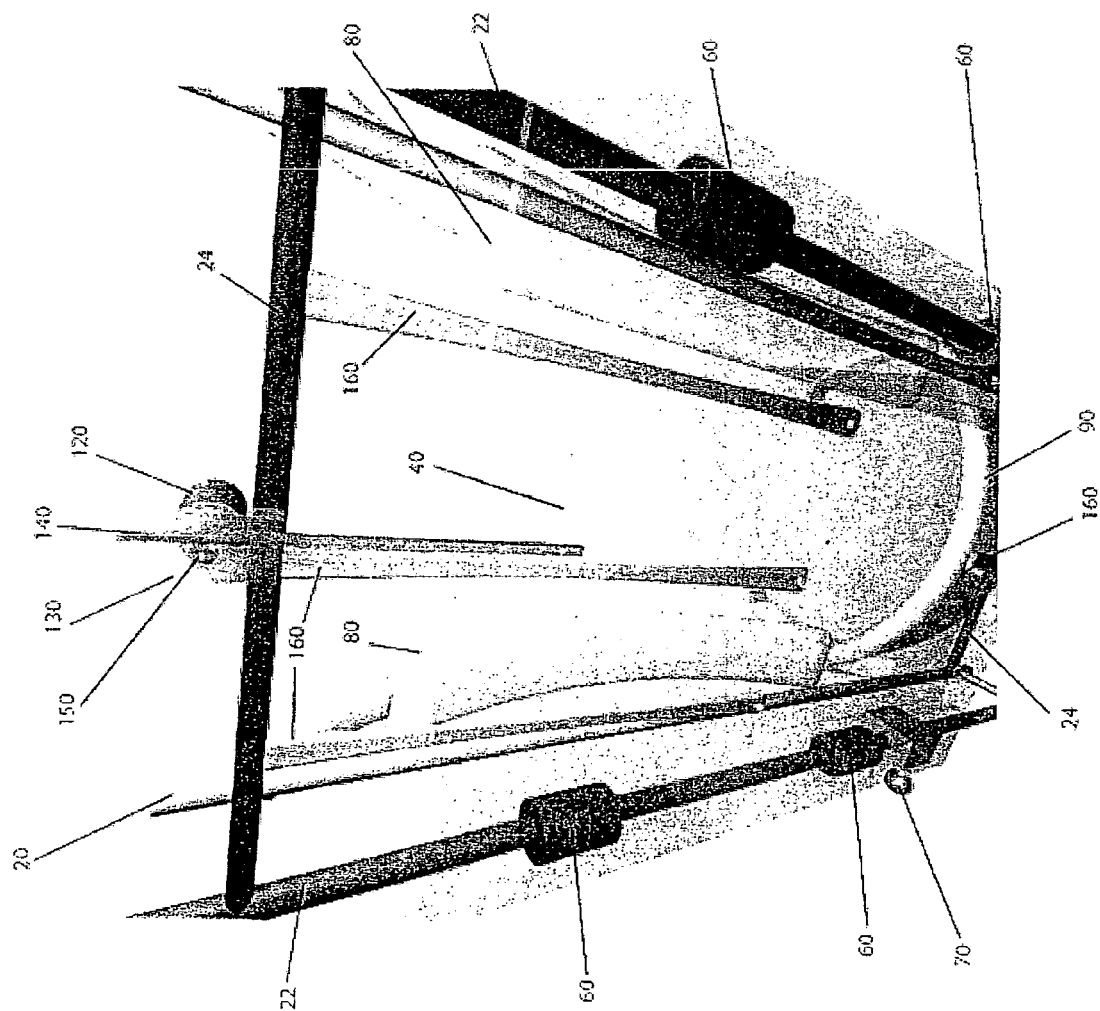
FIG. 9 illustrates the embodiment of FIG. 7 where the springs are replaced with elastic straps.

As illustrated in FIG. 9, the springs in any of the embodiments may be replaced with elastic straps or cords (e.g. bungee cords) 160 having the appropriate tensile strength and elasticity.

Figure 10:
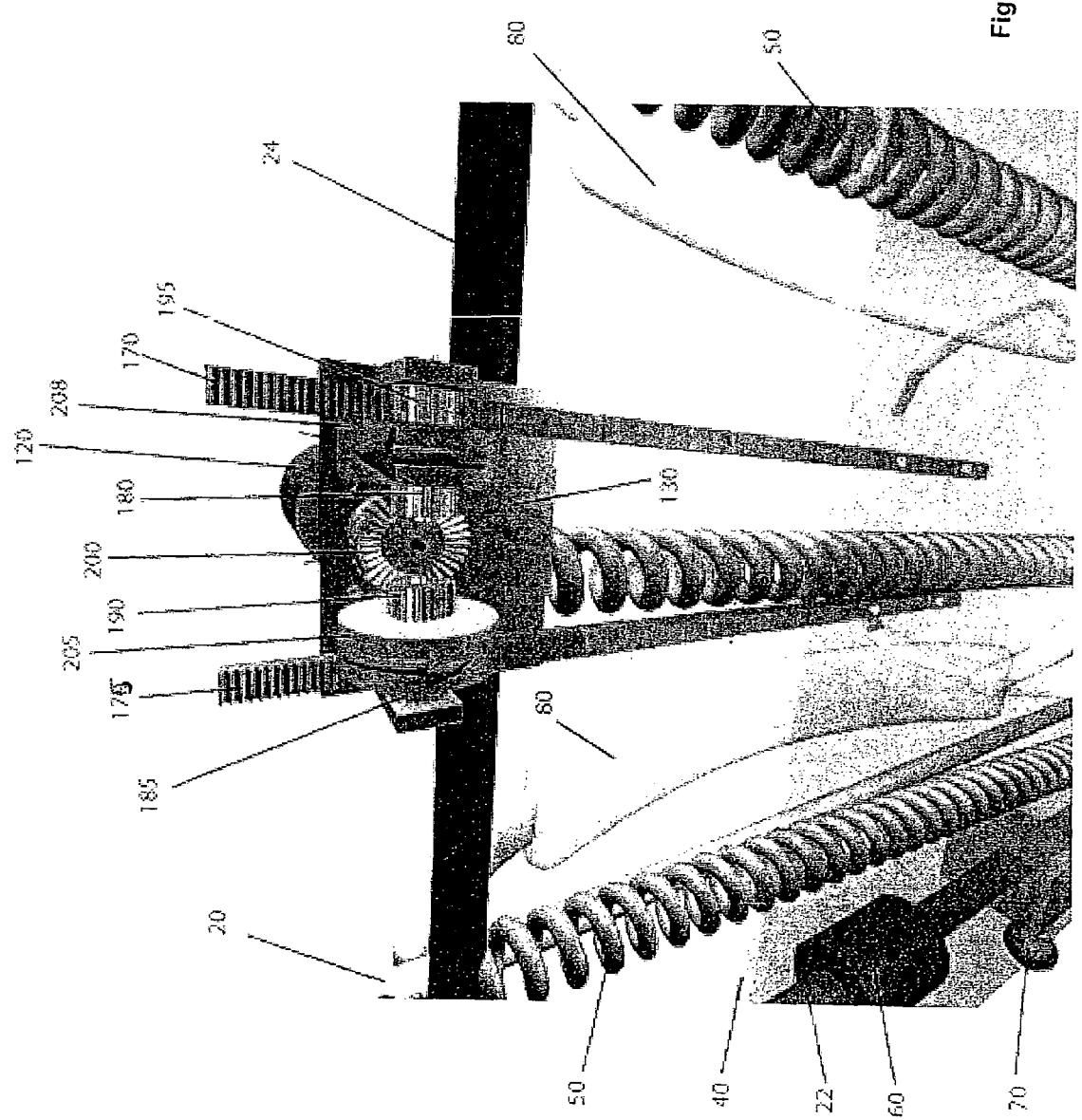
FIG. 10 illustrates a third embodiment of a mechanism for transferring mechanical movement to an electric motor in a unidirectional manner using two rack and pinion systems, one for upward movement and one for downward movement.

FIG. 10 illustrates a third embodiment of a mechanism for transferring mechanical movement to an electric motor unidirectionally using two racks 170 and 175 and two sets pf pinion gears 180, 195 and 185, 190, one rack and pinion gear for upward movement (rack 175 and pinion gears 185, 190) and one rack and pinion gear for downward movement (rack 170 and pinion gears 180, 195). Better electricity generation may be achieved by providing unidirectional movement of the DC servo motor 120. As illustrated, the two racks 170 and 175, two pinion gears 180 and 190, and two free wheels 205, 208 (with opposite polarities) are attached to the motor gears (FIG. 8b) to facilitate clockwise cranking of the motor gear both as the suspended load 30 rises and as suspended load 30 falls during walking. As illustrated, one rack 170 drives the motor gear on the way up and the other rack 175 drives the motor gear on the way down. When coupled to a fly wheel 200 to drive the motor gear in one constant direction, this movement provides positive current with less fluctuation in voltage and obviates the need for a rectifier circuit.

Figure 11:
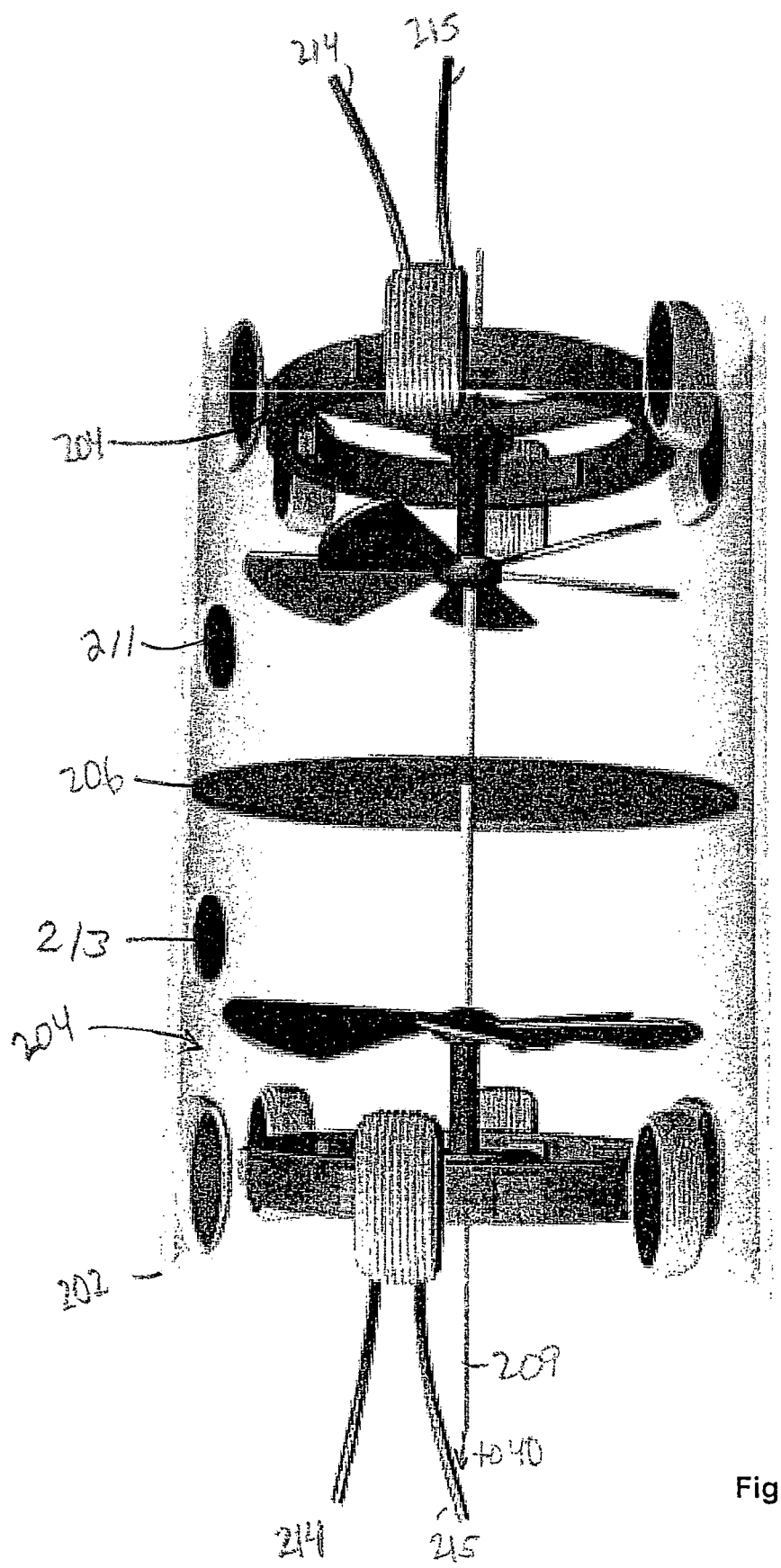
FIG. 11 illustrates an alternate embodiment of a suspended-load backpack in which the motor is replaced by a unidirectional generator including a cylinder with turbine-driven generators on the top and bottom for use in generating electrical energy.

FIG. 11 illustrates another implementation of a unidirectional generator involving using a cylinder 202 with turbine-driven generators 204 on the top and bottom. In the illustrated embodiment, either the fan blades or the generator polarity would need to be opposite at top and bottom to permit positive current to be generated both when the piston 206 is moved up and down by load support structure 40. During use, as the input rod 209 connected to the load support structure 40 moves up and down, the piston 206 is moved up and down to turn the fans of generators 204 at the positive pressure end. Positive voltage is generated at both ends because the fans are cut with opposite blade directions. This also requires two one-way valves 211 and 213 at the respective ends. Thus, as piston 206 moves up, air comes in behind it from the one way valve 213 at the bottom. The one way valve 213 keeps air from moving over the bottom fan blade in the wrong direction (which would cause negative voltage).The air flow produced can be used to cool the operator. The generated electricity is output via leads 214, 215 as indicated.

Figure 12:
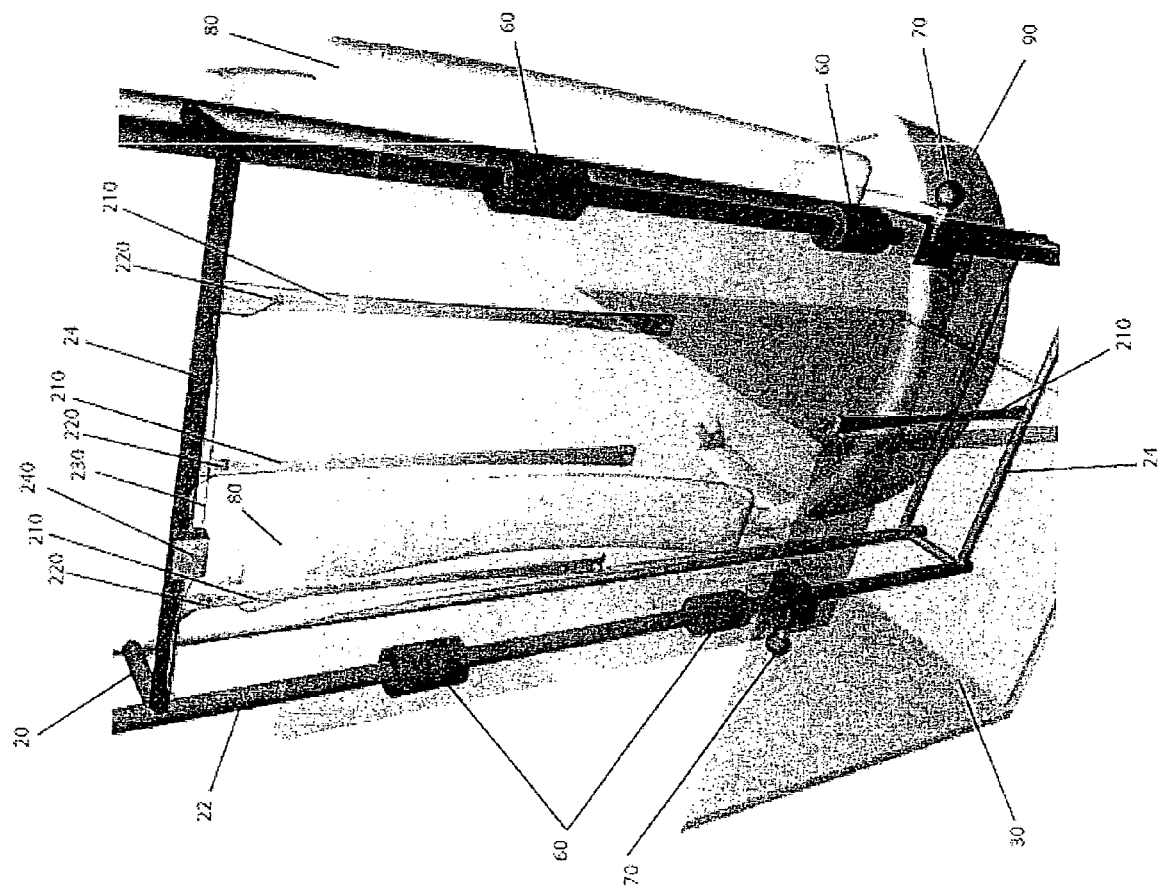
FIG. 12 illustrates another alternate embodiment of a suspended-load backpack in which electrical energy is generated by electroactive polymer (EAP) straps that connect the suspended load to the frame.

FIG. 12 illustrates an alternate embodiment of a suspended-load backpack in which electrical energy is generated by electroactive polymer (EAP) straps 210 that connect the suspended load to the frame. In this embodiment, the function of the springs 50 and DC servo motor 120 is replaced by "artificial muscles," such as electro-active polymers (EAPs) 210 of the type described by Pelrine et al., for example. EAPs 210 and other artificial muscles are elastic materials that can replace the springs 50. EAPs 210 have the special properties that they function like a variable capacitor that changes capacitance based on changes of their thickness and area. Hence, the associated power electronics circuit can be configured so that as the EAP 210 is deformed in a repetitive cycle by the mechanical work of the load, the power electronics can energize the EAP 210 and harvest electrical energy from it. As illustrated in FIG. 12, this electricity may be captured by electrodes 220 and forwarded via wires 230 to the power control circuitry 240 which extracts electrical energy from the outputs of the electrodes 220 of the EAPs 210 as described, for example, by Pelrine et al. in an article entitled "Dielectric elastomers: Generator mode fundamentals and applications," Proceedings of SPIE—The International Society for Optical Engineering, Vol. 4329, 2001, pp. 148-156), the contents of which are hereby incorporated by reference. Hence, EAPs 210 serve the function of an electrical generator as well as load suspension device, thereby obviating the need for the DC servo motor 120.

EAPs 210 and other "artificial muscles" currently in development have several potential advantages. First, all of the mechanical energy extracted during relative movement of the load 30 will be stored in the EAP 210, thus avoiding frictional losses in gears of an electromagnetic system. Second, much higher efficiencies of conversion of mechanical energy to electrical energy is offered by EAP 210 than by conventional motors where losses are considerable. Third, as noted by Pelrine et al., the energy density of EAPs 210 are very high compared to electromagnetic technology (i.e., at least an order of magnitude higher). Moreover, EAPs would be much lighter than the springs 50 and DC servo motor 120 required for conventional electrical generation. It is further recognized that to extract electrical energy efficiently the movement of the load will need to be "geared" to he optimal strain of the EAP 210. Accordingly, a mechanical transformer, as simple as a lever, may need to be used to accomplish this.

The backpack described above has been found to generate an average electrical power of about 2 W (peak is 10 W) when walking at 3.5 MPH with a 40 lb load. At present, EAPs do not permit generation of this amount of power in part because of technical problems with electrodes and durability. However, the inventor contemplates that EAPs will soon develop to the extent that improved power levels will be obtained, thereby making the EAP embodiment of FIG. 12 more attractive for the extraction of electrical energy.

Suspended-Load Backpack for Minimizing Shoulder Strain

Figure 13:
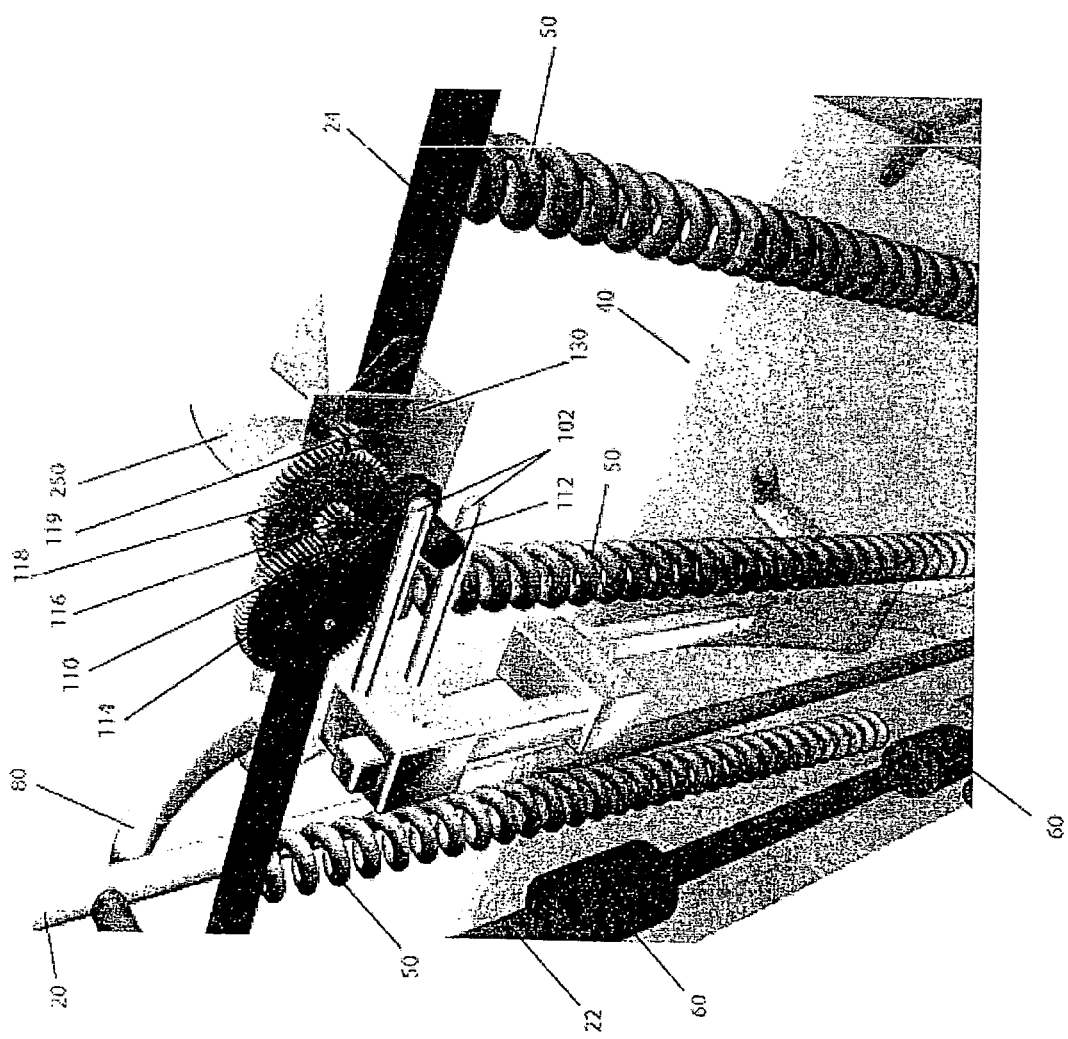
FIG. 13 illustrates an embodiment in which a simple frictional device such as a fan is driven by the movement of the suspended load in an attempt to prevent resonance in the movement of the load during rapid movement.

Suspension of the load 30 in the backpack 10 reduces the vertical movements of the load 30 with respect to the ground. As noted above with respect to FIG. 3, this permits load carriage to be more comfortable at moderate speeds and permits one to obtain faster load carriage speeds (i.e., one can run fast with a heavy pack), which is not possible (or far less stable) without load suspension. While it is possible to walk with just the springs 50 attached to the load 30, as one runs a resonance will be achieved and the movement of the load will become too large and difficult to control. Hence, some energy has to be removed from the system to prevent resonance. The most basic way this can be achieved is by driving a simple frictional device with the lever or rack and pinion. Although any frictional device would work, a particularly attractive one is a fan because the air circulated by the fan can provide cooling to the individual carrying the pack. FIG. 13 illustrates an embodiment in which a fan 250 is driven by the movement of the suspended load 30 in an attempt to prevent resonance in the movement of the load 30 during running. Thus, the backpack of FIG. 13 cools the wearer, prevents resonance movement of the load 30, thereby permitting controlled up and down movement, and reduces forces on the shoulders and the rest of the body of the wearer.

The benefit of preventing such resonance movement of the load 30 (i.e., permitting controlled up and down movement) was proven experimentally by filling a backpack 10 of the embodiment of FIG. 6 with a 40 lb load (total weight is ~50 lb) and having the wearer run on a treadmill (see FIG. 3).

When the load 30 was free to move up and down on the frame 20 with some damping of the movement with respect to the frame to control resonance, the wearer was able to run comfortably in excess of 6 miles an hour. The load 30 was then clamped so that it would not move up and down on the frame 20. The wearer was unable to continue running comfortably and would go wildly out of control. Thus, the invention permits one to run with large loads, which is simply not possible otherwise. The invention thus has obvious implications for the military as well as athletic training.

Figure 14:
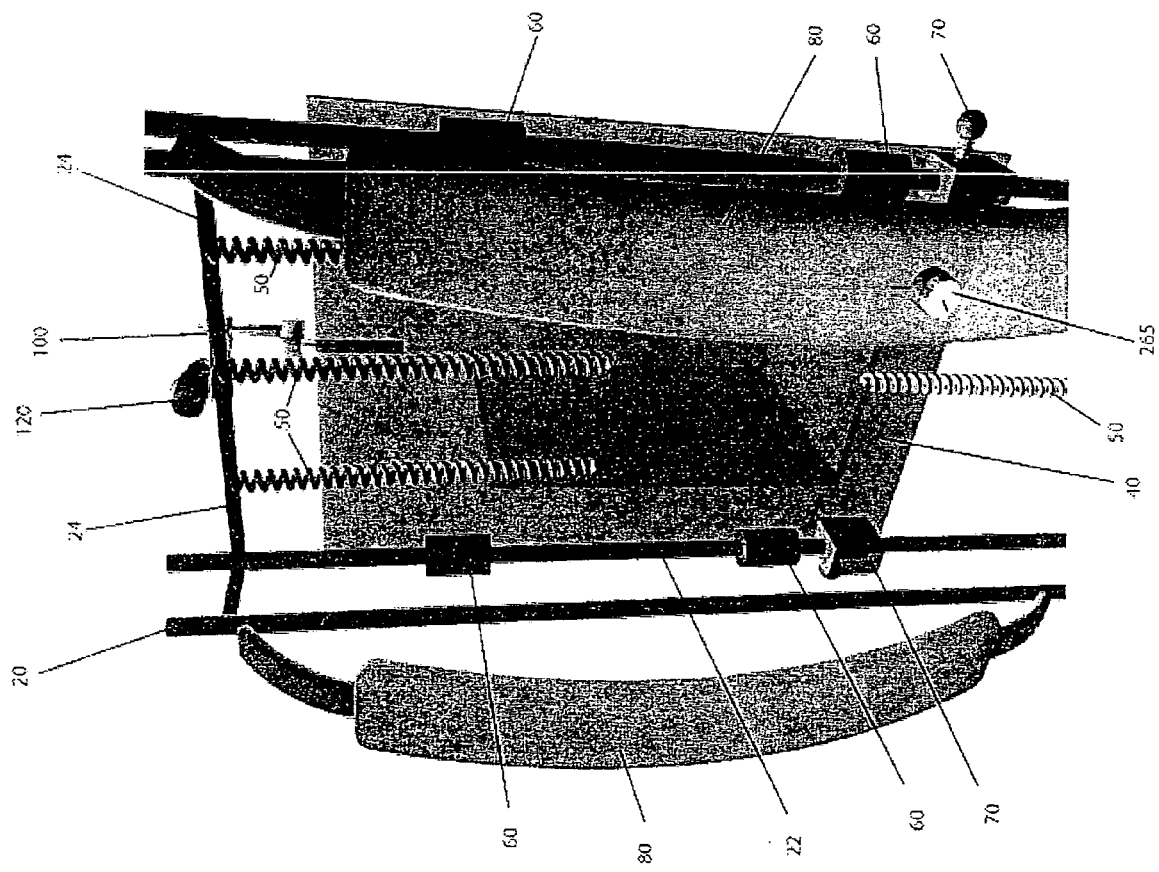
FIG. 14 illustrates the embodiment of FIG. 6 modified to include a friction adjustment device that allows the wearer to manually adjust the resistive torque generated by the motor.
Figure 15:
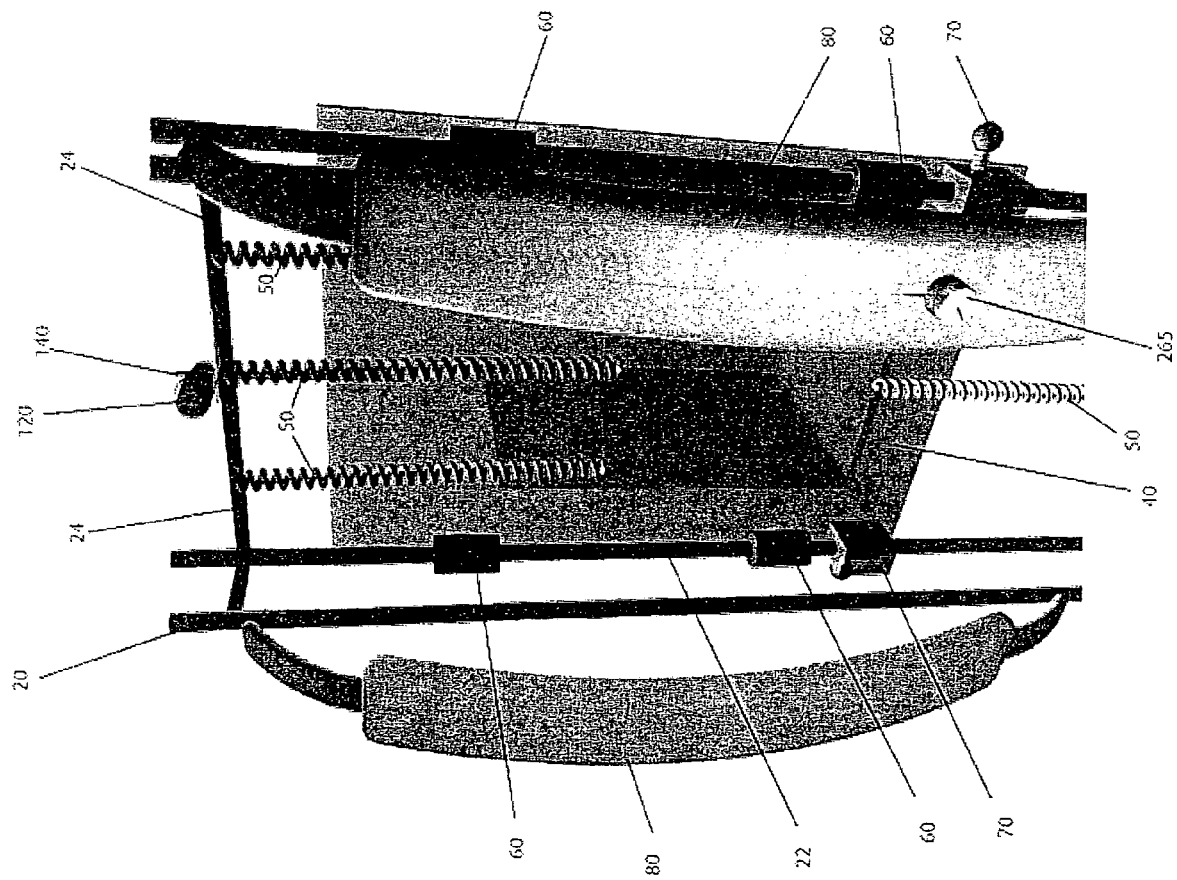
FIG. 15 illustrates the embodiment of FIG. 7 modified to include a friction adjustment device that allows the wearer to manually adjust the resistive torque generated by the motor.
Figure 16:
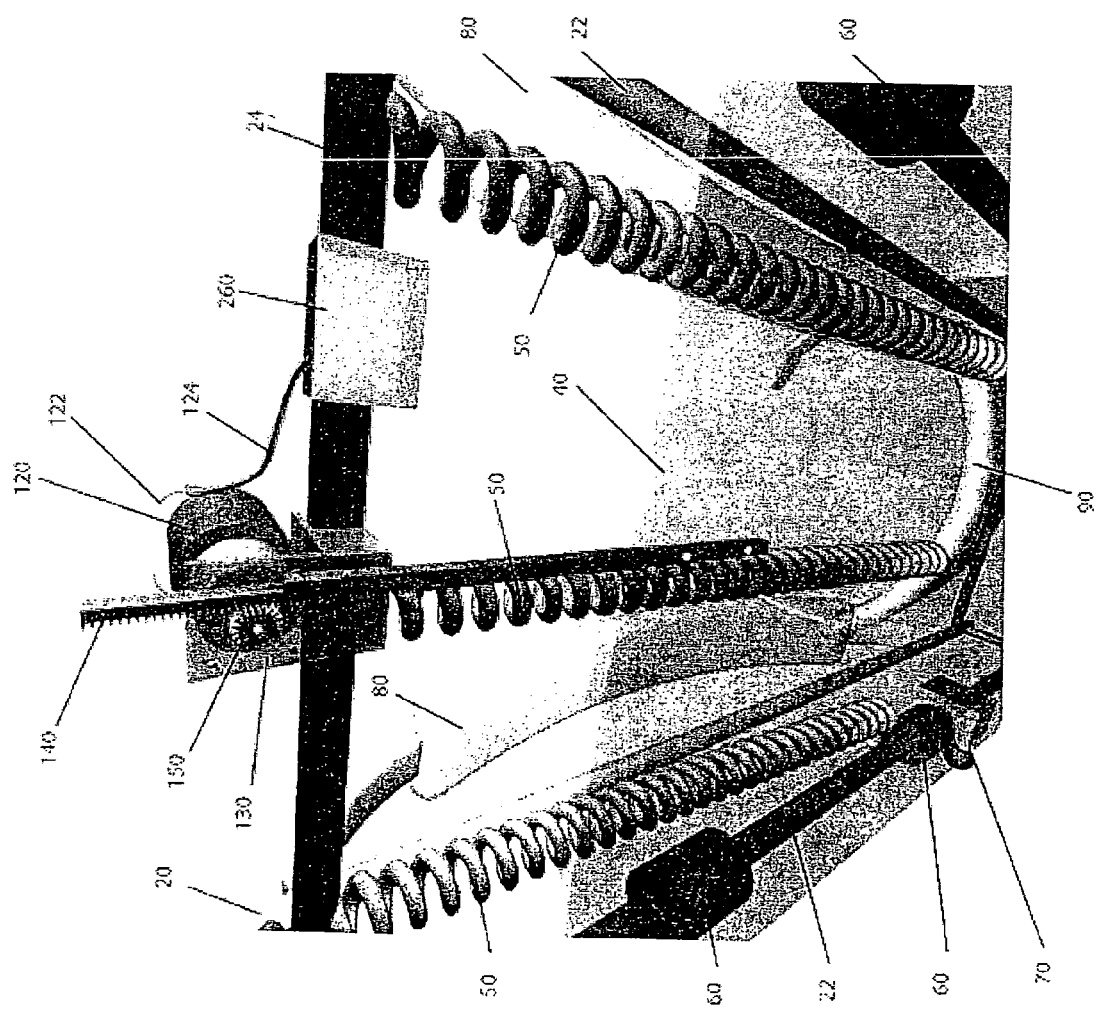
FIG. 16 illustrates the embodiment of FIG. 7 modified to include a microprocessor that calculates the resistance across the motor on-the-fly and adjusts the resistance as desired to minimize excess movement of the backpack during rapid movement.

A more sophisticated system includes a frictional device whose friction can be easily adjusted. For example, FIG. 14 illustrates the embodiment of FIG. 6 modified to include a friction adjustment device (potentiometer) 265 that allows the wearer to adjust the resistive torque generated by the DC servo motor 120. As known by those skilled in the art, one may alter the resistive torque generated by the DC servo motor 120 by altering the resistance value of potentiometer 265 across the output of the DC servo motor 120. Potentiometer 265 and/or different resistors in a switch box may provide differences in torques at a given speed for embodiments including a lever (FIG. 14) or a rack (FIG. 15) that can be adjusted for load and gait. It may be found, however, that to optimize load suspension (in theory one would want the load to stay at the same vertical height throughout the step cycle), it may be necessary to actively control the torque during the step. For this to be accomplished, a microprocessor 260 (FIG. 16) may be used that receives inputs from a tachometer (not shown) on the DC servo motor 120 as well as accelerometers on the pack frame 20 and load 30 (not shown). Using these inputs, the microprocessor 260 may calculate the best torque and change the load resistance across the DC servo motor 120 on-the-fly. This can be achieved by either the lever or rack & pinion system of FIGS. 14 and 15, respectively. Of course, since electricity is being generated, the generated electricity may be used to provide the power for the microprocessor 260, and hence a high level of ergonomic benefit free of battery power. Also, adjusting the load resistance in this manner will have a damping effect and provide an opportunity to set the best damping of movement of the load with respect to the frame and/or the ground for a particular gait or speed.

Day Pack Embodiment

Figure 17:
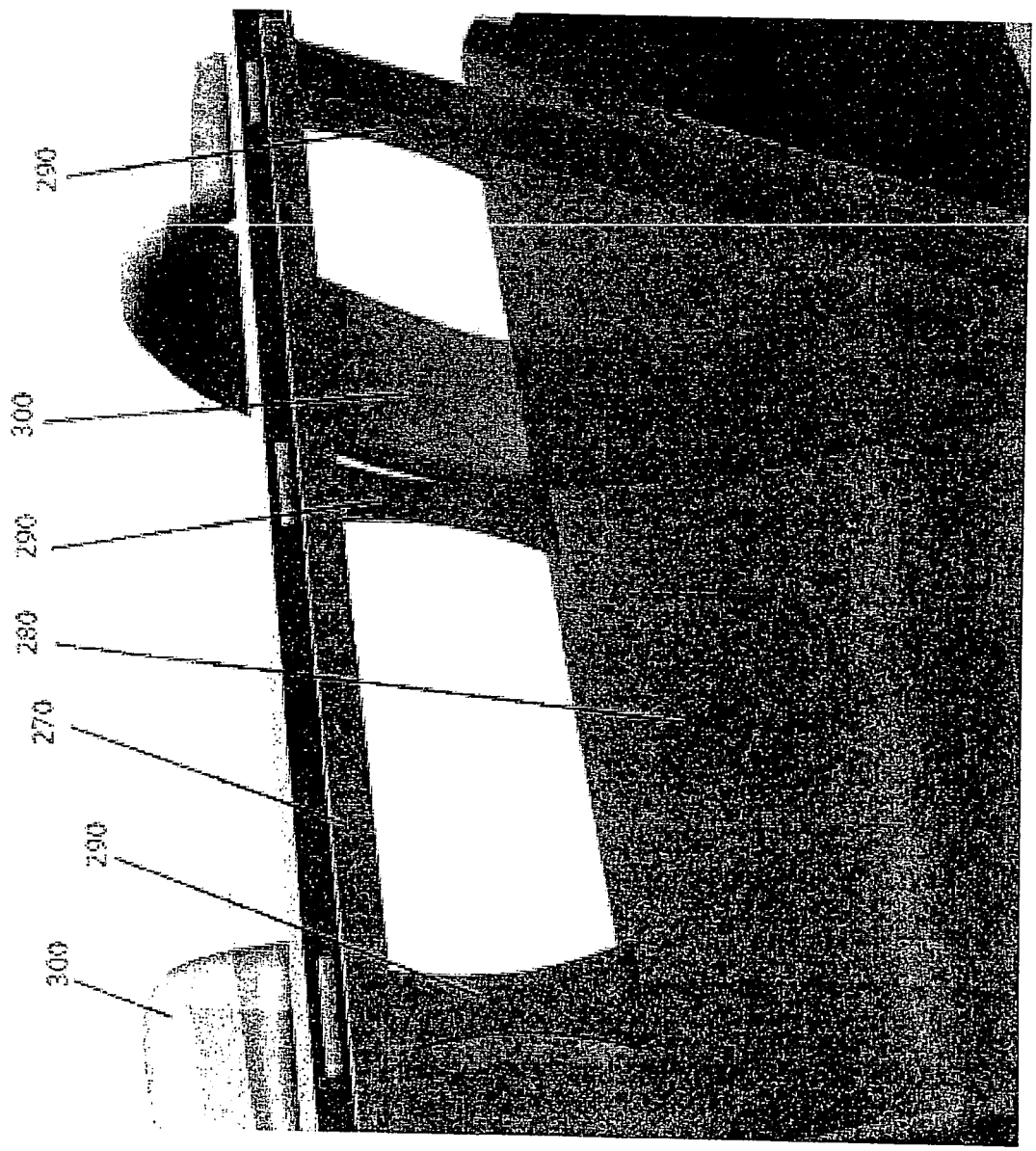
FIG. 17 illustrates an embodiment of a student backpack whereby a container for the load is suspended by elastic straps from an internal frame.
Figure 18:
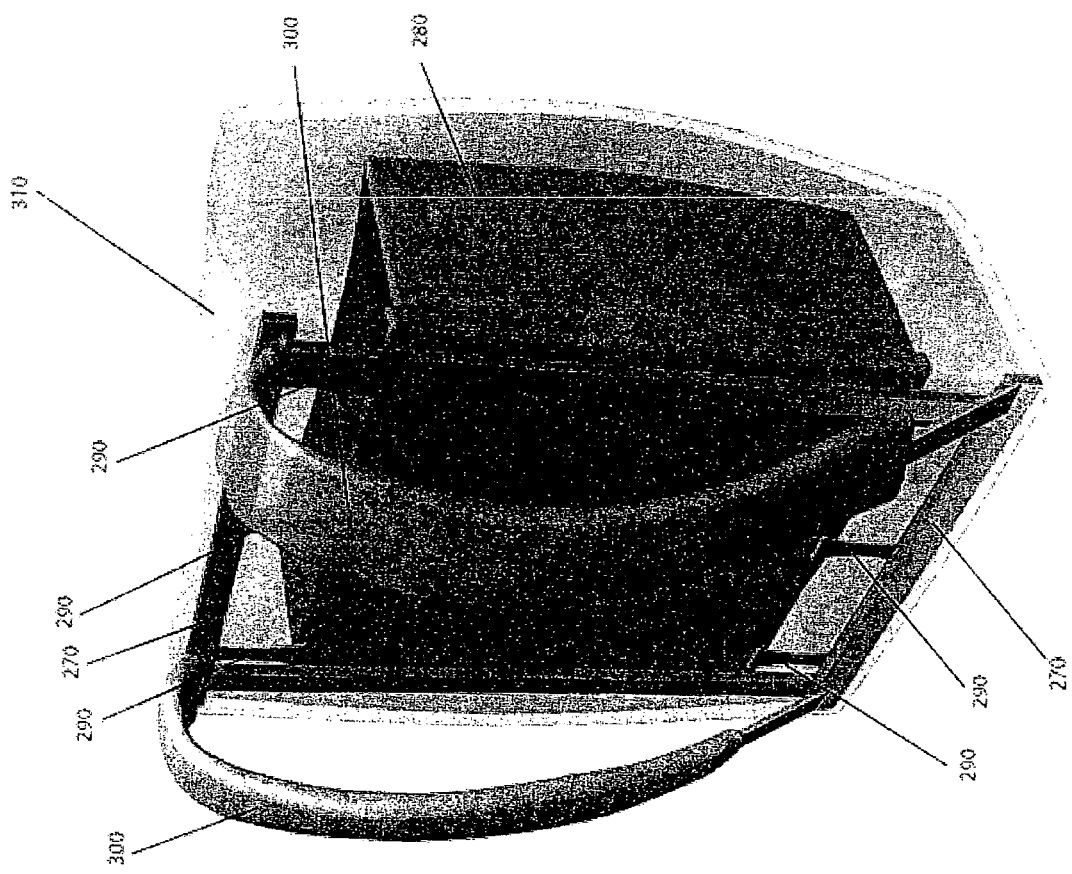
FIG. 18 illustrates a rear perspective view of the backpack of FIG. 17.

It is not necessary for the backpack to have a large external frame as illustrated in the above embodiments. Rather, the ergonomic advantages of the invention can be provided to day packs or student book bags as well, particularly those fitted with an light weight internal frame. FIGS. 17 and 18 show such an arrangement where a Kelty day pack which normally comes with two aluminum stays is fitted with additional stays across the top and the bottom to form a frame 270. In this configuration, clips or jam cleats (not shown) hold sheets of elastic material 290 that suspend a bag 280 within the pack 310. Clips or jam cleats are desired that permit the tension of the elastic material 290 to be adjusted according to the load. Heavy books (or other dense materials such as water) are inserted into this bag 280 and the suspension of the bag 280 reduces shoulder forces applied via shoulder straps 300 during walking for the same reasons as explained above. Suspension of the load in this manner also permits running with a sizable load that would otherwise be very difficult. It should be noted that with the development of artificial muscle technology, replacement of elastic sheeting with EAPs would permit electrical energy generation as well.

Hybrid Device: Electricity Generation While Minimizing Shoulder Strain

Many of the embodiments of backpacks for generating electricity set forth above have the same configurations as those for improving ergonomics. However, because the goals differed, the control equipment would be optimized for each particular function. For instance, in the embodiment of FIG. 16, the backpack 10 includes a frame 20 with a DC servo motor 120 driven by lever 110 (FIG. 6) or rack 140 and pinion gear 150 (FIG. 7) with an attached microprocessor 260 that calculates the appropriate load for the DC servo motor 120 to optimize ergonomic consideration and speed. As noted above, this system also can generate electricity—certainly enough to power the microprocessor 260. The basic point is that the driven motor 120 (or EAPs 210) can both power electricity generation and reduce locomotion induced forces. To an extent these two functions are compatible—i.e., when running or walking fast with the backpack, mechanical energy must be removed from the system to prevent resonance. At the same time, this mechanical energy can be converted to electrical energy providing benefit for both functions. While if one were to optimize the system for electricity generation, it may be somewhat non-optimal for reduction in locomotive induced force, and vice-a versa, under microprocessor control one may tune the system for electricity generation or for ergonomic considerations depending on what is most important to the operator. Hence, in a preferred embodiment, the backpack of the invention is a hybrid device that utilizes motors or artificial muscles and allows the operator to decide what activity to optimize for (or somewhere in between) and hence adjust the system appropriately.

Those skilled in the art will also appreciate that numerous other modifications to the invention are possible within the scope of the invention. For example, if load shifting during rapid movements become a significant problem, the lock on the suspended load may be designed to engage automatically. Also, the motor described herein may also be replaced by a single crystal 1-3 composite of the type described by Park et al. in "Ultrahigh strain and piezoelectric behavior in relaxor based ferroelectric single crystals", *J. Appl. Phys.* 82, 1804 (1997).or by PVDF devices of the type described by Xia et al. in "High Electromechanical Responses in Terpolymer of Poly(vinylidene fluoride trifluoroethylene-chlorofluoroethylene" *Adv. Maters.* Vol. 14 p. 1574 (2002), that can be used to generate electricity when pulled or stretched by the load attached thereto. Accordingly, the scope of the invention is not intended to be limited to the preferred embodiment described above, but only by the appended claims.

What is claimed:

1. A suspended load backpack, comprising:
   a frame, that moves up and down with a gait of a wearer of the backpack;
   shoulder straps attached to the frame;
   a load storage bag for accepting a load to be carried by said backpack; and
   at least one elastic element that connects the load storage bag to the frame, the elastic element having a modulus of elasticity that permits the load storage bag and the load to move up and down relative to the frame so that vertical movements of the load and storage bag relative to the ground are smaller in amplitude than vertical movements of the wearer and the frame relative to the ground so as to reduce, up and down motion of the load relative to the ground during the gait of the wearer of the backpack.

2. A suspended load backpack as in claim 1, further comprising an outer shell that surrounds at least said load storage bag.

3. A suspended load backpack as in claim 1, wherein said at least one elastic element connects the load storage bag to a top and a bottom portion of said frame.

4. A suspended load backpack as in claim 1, wherein said at least one elastic element is a spring.

5. A suspended load backpack as in claim 1, wherein said at least one elastic element is an elastic strap.

6. A suspended load backpack as in claim 1, further comprising a support plate connected to said load storage bag, said support plate being connected to the frame by said at least one elastic element.

7. A suspended load backpack, comprising:
a frame;
shoulder straps attached to the frame;
a load storage bag for accepting a load to be carried by said backpack;
a support plate connected to said load storage bag, said support plate being connected to the frame by said at least one elastic element; and
at least one elastic element that connects the load storage bag to the frame, the elastic element having a modulus of elasticity that permits the load storage bag and the load to move up and down relative to the frame in accordance with a gait of a wearer of the backpack so as to reduce up and down motion of the load relative to the ground,
wherein said frame has at least two vertical rods, further comprising bushings on each of said vertical rods, said bushings being connected to said support plate on opposite sides of said support plate and adapted to move up and down on said vertical rods with up and down movement of said load storage bag and said support plate.

8. A suspended load backpack as in claim 7, further comprising at least one locking device connected to at least one of said vertical rods and adapted to prevent said support plate from moving with respect to said frame when said locking device is tightened.

9. A suspended load backpack as in claim 1, further comprising a lever actuator adapted to move up and down with the load storage bag relative to the frame.

10. A suspended load backpack as in claim 9, further comprising a lever connected to gears and adapted to turn said gears in response to up and down movement imparted to said lever by said lever actuator as the load storage bag moves up and down.

11. A suspended load backpack as in claim 10, further comprising a fan connected to said gears so as to turn in response to up and down movement imparted to said lever by said lever actuator as the load storage bag moves up and down, said fan being mounted on said frame so as not to move up and down relative to said frame.

12. A suspended load backpack as in claim 10, further comprising a DC servo motor mounted to said frame and responsive to said gears so as to turn gears within the DC servo motor, whereby turning of said gears within the DC servo motor results in the generation of electricity.

13. A suspended load backpack as in claim 12, further comprising a manually controlled potentiometer adapted to adjust a value of load resistance across an output of the DC servo motor.

14. A suspended load backpack as in claim 12, further comprising a tachometer on the DC servo motor, an accelerometer on the frame, an accelerometer on the load storage bag, and a microprocessor responsive to outputs of said tachometer and accelerometers to calculate a value for said load resistor on-the-fly as output values of said tachometer and accelerometers change.

15. A suspended load backpack as in claim 1, further comprising a rack adapted to move up and down with the load storage bag relative to the frame and a pinion gear connected to said frame so as not to move up and down relative to the frame.

16. A suspended load backpack as in claim 15, wherein said rack is adapted to cause said pinion gear to turn as said rack moves up and down with said load storage bag.

17. A suspended load backpack as in claim 16, further comprising a fan mounted on said frame so as not to move up and down relative to said frame and connected to said pinion gear so as to turn in response to up and down movement imparted to said pinion gear by movement of said rack.

18. A suspended load backpack as in claim 16, further comprising a DC servo motor mounted to said frame and responsive to said pinion gear so as to turn gears within the DC servo motor, whereby turning of said gears within the DC servo motor results in the generation of electricity.

19. A suspended load backpack as in claim 18, further comprising a manually controlled potentiometer adapted to adjust a value of load resistance across an output of the DC servo motor.

20. A suspended load backpack as in claim 18, further comprising a tachometer on the DC servo motor, an accelerometer on the frame, an accelerometer on the load storage bag, and a microprocessor responsive to outputs of said tachometer and accelerometers to calculate a value for said load resistor on-the-fly as output values of said tachometer and accelerometers change.

21. A suspended load backpack as in claim 15, further comprising another rack adapted to move up and down with the load storage bag relative to the frame and another pinion gear connected to said frame so as not to move up and down relative to the frame.

22. A suspended load backpack as in claim 21, further comprising a gear that engages with said pinion gear and said another pinion gear, said pinion gear rotating said gear in a first direction when said rack moves up with said load storage bag and said another pinion gear rotating said gear in said first direction when said another rack moves down with said load storage bag.

23. A suspended load backpack as in claim 22, further comprising a DC servo motor mounted to said frame and responsive to said gear so as to turn gears within the DC servo motor, whereby turning of said gears within the DC servo motor results in the generation of electricity.

24. A suspended load backpack as in claim 1, further comprising a rod adapted to move up and down with the load storage bag and a piston mounted on the frame and responsive to up and down movement of said rod, said piston including a diaphragm that moves up and down with said rod within a cylinder so as to drive turbine-driven generators on the top and bottom of said cylinder.

25. A suspended load backpack as in claim 24, wherein said turbine-driven generators each comprise fans with blade directions that are opposite to each other.

26. A suspended load backpack as in claim 1, wherein said at least one elastic element comprises electroactive polymer (EAP) straps.

27. A suspended load backpack as in claim 26, further comprising electrodes on each of said EAP straps and power control circuitry responsive to outputs of said electrodes.

28. A suspended load backpack for use in the generation of electricity, comprising:
a frame;
shoulder straps attached to the frame;

a load storage bag for accepting a load to be carried by said backpack;

at least one electroactive polymer (EAP) strap that connects the load storage bag to the frame, each EAP having a modulus of elasticity that permits the load storage bag and the load to move up and down relative to the frame in accordance with a gait of a wearer of the backpack, wherein each EAP converts up and down movement of the load storage bag and the load into electrical energy.

29. A suspended load backpack as in claim 28, further comprising electrodes on each of said EAP straps and power control circuitry responsive to outputs of said electrodes.

* * * * *